(12) United States Patent
Martindale et al.

(10) Patent No.: US 10,031,505 B2
(45) Date of Patent: Jul. 24, 2018

(54) BEVERAGE DISPENSING APPARATUS WITH SMARTCUP TAG IDENTIFICATION AND VERIFICATION

(71) Applicant: Automatic Bar Controls, Inc., Vacaville, CA (US)

(72) Inventors: William Russell Martindale, Vacaville, CA (US); Nicola La Gloria, Campbell, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 242 days.

(21) Appl. No.: 15/167,870

(22) Filed: May 27, 2016

(65) Prior Publication Data
US 2016/0363921 A1 Dec. 15, 2016

Related U.S. Application Data

(60) Provisional application No. 62/167,861, filed on May 28, 2015.

(51) Int. Cl.
*G05B 19/12* (2006.01)
*G06F 21/31* (2013.01)
(Continued)

(52) U.S. Cl.
CPC ......... *G05B 19/128* (2013.01); *G05B 19/042* (2013.01); *G06F 21/31* (2013.01);
(Continued)

(58) Field of Classification Search
CPC .................................................... G06Q 40/10
(Continued)

(56) References Cited

U.S. PATENT DOCUMENTS

2012/0211516 A1 8/2012 Zapp et al.
2014/0319167 A1* 10/2014 Dorney .............. A47G 19/2227
222/1
2015/0191341 A1 7/2015 Martindale et al.

FOREIGN PATENT DOCUMENTS

EP 1986150 10/2008
EP 1986150 A2 10/2008
(Continued)

OTHER PUBLICATIONS

International Preliminary Report on Patentability in PCT/US2016/034865, dated Dec. 7, 2017, 9 pages.
(Continued)

*Primary Examiner* — Russell S Glass
(74) *Attorney, Agent, or Firm* — Kilpatrick Townsend & Stockton LLP

(57) ABSTRACT

In many aspects, a system for a beverage dispenser can include smartcups and smartcup application management systems configured to validate and identify smartcups for dispensing a beverage. Identifying and validating the authenticity of smartcups as well as identifying registered consumers associated with smartcups may provide more secure beverage dispensers that may be placed in public with minimal oversight. Additionally, by identifying registered users associated with a registered smartcup and providing an individualized and streamlined consumer experience, consumer interactions can be improved with a beverage dispenser/provider and may lead to increased usage by consumers.

14 Claims, 21 Drawing Sheets

(51) Int. Cl.
*G06Q 30/06* (2012.01)
*G06Q 50/12* (2012.01)
*G05B 19/042* (2006.01)
*G06K 7/10* (2006.01)

(52) U.S. Cl.
CPC ......... *G06Q 30/0635* (2013.01); *G06Q 50/12* (2013.01); *G05B 2219/25294* (2013.01); *G05B 2219/2645* (2013.01); *G06K 7/10861* (2013.01)

(58) Field of Classification Search
USPC .......................................................... 705/15
See application file for complete search history.

(56) References Cited

FOREIGN PATENT DOCUMENTS

| WO | 2004-056695 A1 | 7/2004 |
| WO | WO 2004056695 | 7/2004 |
| WO | 2016164017 A1 | 9/2014 |
| WO | WO 2014164017 | 10/2014 |

OTHER PUBLICATIONS

International Search Report and Written Opinion in PCT/US2016/034865, dated Sep. 12, 2016, 12 pages.
PCT/US2016/034865, International Search Report and Written Opinion, dated Sep. 12, 2016, 12 pages.

* cited by examiner

Dispenser and Smartcup Entity Database (DSED)

| Domain | Smartcup ID | Dynamic Security Token | Dispense Mode | # of Available Dispenses | Volume Available | Expiration Date | Associated User ID | Visual Identifier | Preferred Drink |
|---|---|---|---|---|---|---|---|---|---|
| 1 | x514522323 | asd3dfef | Volume | - | 128 Ounces | - | User 1 | a2453872 | Brand A |
| 2 | x5153adr5a | asdf1234 | Time | - | - | 3/10/2015 | User 2 | a2435547 | Brand B |
| 1 | agw354883 | eww421wd | Dispense Number | 5 | - | - | User 3 | zdfewr78 | Brand B |
| 1 | a5872wrcc | asztcg55 | Dispense Number | 4 | - | - | User 4 | aer87354 | Brand C |
| 1 | axt5891435 | a3344551 | Volume | - | 32 Ounces | - | User 5 | s8735drx | Brand E |
| 1 | as222312145 | xe4572sd | Time | - | - | 1 Hour | User 6 | asxeq734 | Brand F |
| 2 | x4387268871 | xe147s83 | Volume | - | 60 Ounces | - | User 7 | q734fsxc | Brand B |
| 3 | ax87133579 | fhj453s7 | Dispense Number | 9 | - | - | User 8 | asd77883 | Brand A |
| 2 | zrewwq822 | s2r8x1q7 | Dispense Number | 10 | - | - | User 9 | 7832148r | Brand Z |

Registered Consumer Database

| User ID | Associated Smartcup Visual Identifier | Smartcup ID | Dynamic Security Token | Product Dispensed | Volume Dispensed | Preffered Drink | Dispense Time/Date | Dispenser/ Location |
|---|---|---|---|---|---|---|---|---|
| User 1 | a2453872 | x514522323 | asd3dfef | Brand A | 16 Ounces | Brand A | 1/4/2015 | d1231 |
| User 2 | a2435547 | x5153adr5a | asdf1234 | Brand B | 30.5 Ounces | Brand B | 1/4/2015 | d1566 |
| User 3 | zdfewr78 | agw354883 | eww421wd | Brand B | 19.3 Ounces | Brand B | 1/4/2015 | d1645 |
| User 4 | aer87354 | a5872wrcc | asztcg55 | Brand C | 15.7 Ounces | Brand C | 1/4/2015 | e1231 |
| User 5 | s8735drx | axt5891435 | a3344551 | Brand E | 20 Ounces | Brand E | 1/4/2015 | f1232 |
| User 6 | asxeq734 | as22312145 | xe4572sd | Brand F | 24 Ounces | Brand F | 1/4/2015 | t1556 |
| User 7 | q734fsxc | x438726871 | xe147s83 | Brand B | 15.5 Ounces | Brand B | 1/4/2015 | s3412 |
| User 8 | asd77883 | ax87133579 | fhj453s7 | Brand A | 30.1 Ounces | Brand A | 1/4/2015 | s5234 |
| User 9 | 7832148r | zrewwq822 | s2r8x1q7 | Brand Z | 31 Ounces | Brand Z | 1/4/2015 | ad123 |

FIG.4

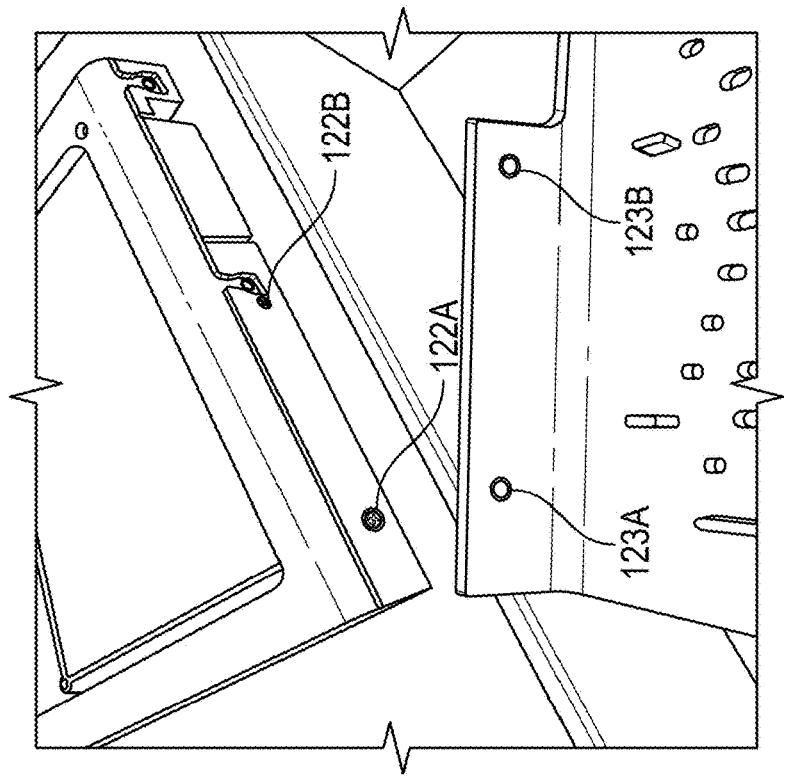
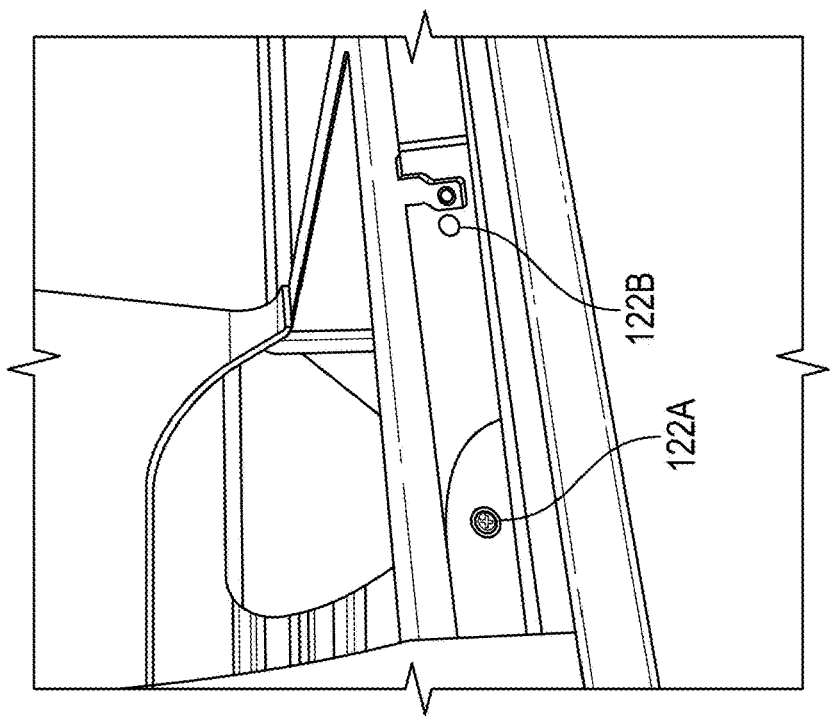
FIG. 12

BEVERAGE DISPENSING APPARATUS WITH SMARTCUP TAG IDENTIFICATION AND VERIFICATION

CROSS-REFERENCES TO RELATED APPLICATIONS

This application claims the benefit of U.S. Provisional Application No. 62/167,861, filed on May 28, 2015 which is incorporated herein by reference.

BACKGROUND

A number of beverage dispenser designs are well known in the art. These include carbonated beverage dispensers, non-carbonated beverage dispensers, beverage brewing systems, and liquor distribution systems. Many beverage dispenser designs have separate nozzles to pour (dispense) different beverages. Some beverage dispensers are capable of dispensing a variety of beverages out of a single nozzle.

Beverage dispensers are convenient because merchants can provide consumers direct access to the beverage dispenser which minimizes employee overhead as customers can serve themselves. However, beverage theft can occur where beverage dispensers are left in the open without close employee oversight. In the past, RFID tags and readers have been used to limit the theft of beverages in publicly accessible areas. However, these systems did not solve all of the beverage theft issues because the RFID tags could be easily cloned, copied, and used on unauthorized cups. Accordingly, there is a need for improved security in RFID cup identification applied to beverage dispensers.

Furthermore, the customer using RFID cups and/or tags is anonymous and it is difficult for merchants to identify and provide personalized services to customers using RFID cups. Thus a need exists for consumer personalization of RFID cups and/or tags.

Embodiments of the invention address the insecure nature of RFID cups and the anonymous nature of such RFID cups and other problems, individually and collectively.

BRIEF SUMMARY

Beverage dispensers, smartcups, and smartcup application management systems configured to validate and identify smartcup tags for dispensing a beverage are provided. Identifying and validating the authenticity of smartcups as well as identifying registered consumers associated with smartcups may provide more secure beverage dispensers that may be placed in public with minimal oversight. Additionally, by identifying registered users associated with a registered smartcup and providing an individualized and streamlined consumer experience, consumer interactions can be improved with a beverage dispenser/provider and may lead to increased usage.

In many aspects, embodiments may include a method of dispensing a beverage at a beverage dispenser. The method comprises a beverage dispenser receiving a smartcup identifier and a dynamic token from a smartcup reader where the smartcup identifier and the dynamic token are read from a smartcup tag. The method further comprises sending a smartcup authentication request including the smartcup identifier and the dynamic token to a smartcup server computer. The smartcup server computer may validate the authenticity of the smartcup identifier and the dynamic token and determine a dispense decision associated with the smartcup identifier. The method further comprises receiving a smartcup authentication response including the dispense decision where the dispense decision indicates whether the beverage dispenser is authorized to dispense the beverage. The method further comprises the beverage dispenser determining an updated dynamic token for the smartcup tag, determining that the dispense decision is affirmative, updating the dynamic token of the smartcup with the updated dynamic token, and dispensing a selected beverage in the cup.

In many aspects, embodiments include a method for dispensing a beverage at a beverage dispenser using registered consumer preferences. The method comprises a beverage dispenser receiving a smartcup identifier from a smartcup tag reader where the smartcup identifier is read from a smartcup tag embedded in a cup. The method further comprises the beverage dispenser sending a smartcup authentication request including the smartcup identifier to a smartcup server computer where the smartcup server computer may determine that the smartcup was previously registered as being associated with a consumer profile. The method further comprises receiving a smartcup authentication response including consumer information from the consumer profile, where consumer information includes the registered consumer preferences associated with the consumer profile. The method further comprises the beverage dispenser displaying the consumer information to a consumer.

In many aspects, embodiments include a system configured to dispense a beverage. The system includes a cup, a beverage dispenser, and a smartcup tag reader. The cup may include a smartcup body, a visual identifier embedded on the smartcup body, and a smartcup tag embedded on the smartcup body. The smartcup tag includes a smartcup identifier that is readable by a smartcup reader. The beverage dispenser includes a dispenser body. The dispenser body includes a drain compartment, a removable drain cover configured to engage with the drain compartment, and a puck configured to engage with the drain cover. The puck may be configured to indicate the placement location for the portable cup to be placed during beverage dispensing. The beverage dispenser may further include a touchscreen coupled to the dispenser body, a beverage dispensing valve, and a control unit electrically coupled to the touchscreen and the beverage dispensing valve. The control unit is configured to read the smartcup identifier from the smartcup tag embedded on the smartcup body, validate the smartcup identifier, and dispense a beverage for a valid smartcup identifier. The beverage dispenser further including a reconfigurable smartcup tag reader configured to read and write data to the smartcup tag embedded in the portable cup. The reconfigurable smartcup tag reader may be electrically coupled to the control unit of the beverage dispenser. The reconfigurable smartcup tag reader may be positioned in one of a group of positions including embedded into a vertical face of the dispenser body, embedded into the bottom of the puck, and embedded into an external platform mounted to one side of the dispenser body.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

BRIEF DESCRIPTION OF THE DRAWINGS

FIG. 3 diagrammatically illustrates a smartcup database associated with the smartcup application computer of FIG. 1.

FIG. 4 diagrammatically illustrates a registered consumer database associated with the smartcup application computer of FIG. 1.

FIG. 12 shows two photographic illustrations of an exemplary reconfigurable beverage dispenser with a reconfigurable smartcup tag reader/writer in a first position where a drip pan cover of the beverage dispenser is held in position through magnetic contacts to ensure the correct position of the smartcup tag reader/writer.

DETAILED DESCRIPTION

Figure 1:
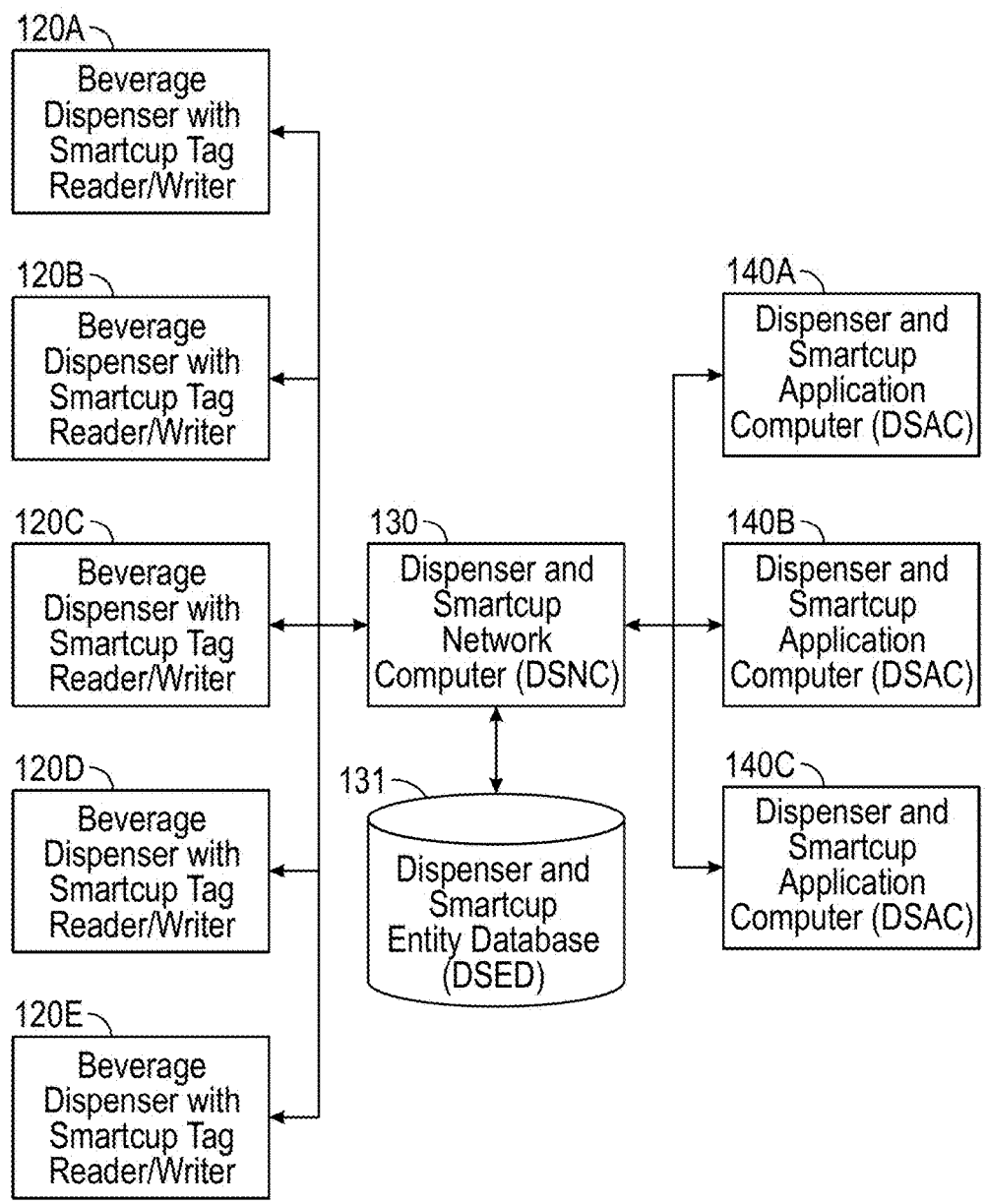
FIG. 1 diagrammatically illustrates a smartcup beverage dispenser network system, according to one embodiment of the present invention.

Embodiments described herein are directed at beverage dispensers, smartcups, and network computer systems that are configured to provide authentication of a smartcup before a beverage is dispensed and provide an enhanced user experience based on user association of smartcups. Additionally, security enhancements may be provided to ensure a beverage provider and/or smartcup provider is protected from malicious third party use of the smartcup technology. For example, embodiments may include a method of identifying a cup at a beverage dispenser using a unique identifier embedded in a smartcup tag, validating the authenticity of the smartcup tag using a security token, validating that the smartcup is eligible for dispensing the beverage, dispensing the beverage, and updating the smartcup tag with an updated security token.

As such, embodiments provide enhanced security because only a single smartcup is active at any given time because the security token can be updated and written to the smartcup tag whenever a smartcup tag interacts with the system. For example, the security token may be updated and written to the smartcup tag after any successful reading event. Thus, if a smartcup tag is copied, stolen, and/or used by a malicious third party, only the smartcup that was last used and received the updated dynamic security token may be used for a future beverage dispense. Any other cup will not have the correct updated dynamic security token. Accordingly, the system will know that the smartcup must have been copied and/or a malfunction occurred during the previous beverage dispense. Thereafter, the system may suspend or deny any further operations or requests associated with a stolen smartcup identifier.

For example, a consumer may purchase a smartcup with 5 refills associated with the smartcup. The smartcup may have an embedded smartcup tag that include an identifier (e.g., "x514522323") and a security token (e.g., "asd3dfef"). When the consumer places the smartcup within the beverage dispenser to be filled, a smartcup tag reader at the beverage dispenser may read the smartcup identifier and the security token from the smartcup tag. The beverage dispenser may then send a request through a dispenser network to a smartcup application computer that is managing and verifying smartcups. The smartcup application manager may verify that the smartcup is valid (i.e., was correctly issued and exists in the dispenser and smartcup entity database), that the security token matches a stored token (e.g., "asd3dfef"), and may ensure available dispenses exist for the smartcup (e.g., 5 refills remaining). If the smartcup application manager verifies the smartcup, an affirmative dispense decision may be returned authorizing the dispenser to dispense the beverage. Additionally, an updated security token (e.g., "as3123ks") may be generated, stored, and delivered to the beverage dispenser and written to the smartcup tag.

Additionally, an updated security token (e.g., "as3123ks") may be generated, stored, and delivered to the beverage dispenser and written to the smartcup tag. Thus, if the consumer's cup is stolen or the smartcup tag is copied, only the smartcup that was last used (and received the latest updated security token) can be used to obtain the next drink. Therefore, if a malicious third party hacks into the merchant system and obtains smartcup identifiers, any fraudulent smartcups cannot be used because the dynamic security token will have been updated. Further, the smartcup application provider may never authorize more beverages than have been paid for a specific smartcup because the dynamic security token is tracked, consistently updated, and use conditions are monitored and updated as dispensing occurs (e.g., 4 remaining refills after the first refill) for the smartcup.

Furthermore, an enhanced user experience may be provided by identifying and delivering user preferences based on registered smartcups. For example, embodiments may include a method of identifying a cup at a beverage dispenser using a smartcup tag reader, identifying a user associated with the smartcup (e.g., using a mobile application to take a picture of a smartcup visual identifier in order to associate the smartcup with a user profile), and providing an enhanced user experience based on known user preferences. For instance, a consumer's preferred beverage, last dispense information, and remaining number of beverage re-fills may be provided to a user through the beverage dispenser. Thus, the consumer's preferences may be stored and provided to a beverage dispenser in order to provide a personalized and enhanced user experience to registered consumers.

Additionally, in some embodiments, a smartcup tag may be embedded in a separate portable item that is not a part of the cup that is used to collect and hold a dispensed beverage. The separate portable item may include a smartcup tag with a smartcup identifier that can be passed to a smartcup reader coupled to a beverage dispenser to authorize dispensing events. For example, a card (e.g., smartcard), a mobile device (e.g., mobile phone), a fob, jewelry (e.g., a watch or a bracelet), and/or other object may have an embedded smartcup tag that may be used to identify a consumer account and may be used to authenticate and validate a dispense operation and/or dispense event. In such embodiments, a user may swipe their portable item (e.g., card, bracelet, phone, watch, etc. with an embedded smartcup tag) onto or near a smartcup tag reader in order to initiate the dispense operation. The processing, verification, and dispensing operation of the system is similar whether the tag is embedded into a cup or into a separate portable item.

In addition, some embodiments of a beverage dispenser include a reconfigurable smartcup tag reader/writer position that includes (i) a reader embedded into vertical face of dispenser, (ii) a reader integrated into the bottom of a puck, and (iii) a reader side-mounted next to a dispenser. The various reconfigurable smartcup rag readers/writers and their corresponding positions provide flexibility regarding beverage dispenser positioning, dispenser design, and allow for merchant flexibility.

Embodiments may provide one or more of advantages to sellers (e.g., retailers) of beverage dispensers, users of beverage dispensers, establishments that sell beverages, and other entities. For example, an advantage to beverage selling establishments includes a streamlined system for selling, monitoring, and delivering the proper amount and number of beverage refills to consumers. Smartcups may be distributed to consumers which include a smartcup tag that has an encoded unique value that ensures the smartcup is used the proper number of times without requiring monitoring by employees or other systems. Further, the systems are more secure and sharing a smartcup with an unauthorized user and sniffing or hacking smartcup tag identifiers will not lead to additional dispenses than those that are purchased through an authorized provider.

Additionally, because each smartcup includes multiple identifiers, the various identifiers including the visual identifier, the tag identifier, and the security token may be compared during processing to validate that the smartcup is authentic. For example, both a smartcup tag identifier and a security token may be included in an authentication request and compared to validate the smartcup, ensure the smartcup is authentic, and ensure a smartcup tag identifier has not been cloned and/or intercepted by a malicious third party.

Because the dynamic security token changes after each beverage dispense, the dynamic security token will only be matched with an authentic smartcup tag that received the previously updated dynamic security token. In response to any read event (or at a convenient time thereafter), a unique smartcup tag identifier and dynamic security token combination is changed in the dispenser and smartcup entity database and thus, any cloned smartcup tags are no longer valid. Accordingly, there can only be a single active smartcup tag at any given time. Accordingly, a smartcup application provider cannot provide more than the appropriate number of dispenses to cloned smartcup tags.

Certain embodiments described herein may provide one or more of the above advantages. One or more other advantages may be readily apparent to one skilled in the art from the disclosure.

I. SmartCup Tag Identification, Verification, and Beverage Dispense Systems

FIG. 1 diagrammatically illustrates a smartcup beverage dispenser network system 100, according to one embodiment of the present invention. The system 100 may include numerous beverage dispensers 120A-120E that are communicatively coupled to a Dispenser and Smartcup Network Computer (DSNC) 130. The DSNC 130 may communicatively couple the one or more beverage dispensers to one or more Dispenser and Smartcup Application Computers (DSAC) 140A-140C.

A beverage dispenser 120 may include any component, system, or machine configured to dispense a beverage. The beverage dispenser 120 may be electrically coupled to a smartcup tag reader/writer such that the beverage dispenser 120 is configured to read and write information to a smartcup tag 111. In some embodiments, the smartcup tag 111 may be embedded in or otherwise integrated with a cup (i.e., a smartcup 110) or other beverage container. The smartcup tag 111 may be embedded into or integrated within the cup body in any suitable position (e.g., bottom, side, etc.) to match a corresponding smartcup tag reader position on the beverage dispenser.

In other embodiments, the smartcup tag 111 may be embedded in or integrated with a separate portable item from the smartcup 110. For example, a smartcup tag 111 may be embedded into a smartcup card, bracelet, lanyard, wallet, mobile phone body, and/or any other item that can be carried by a user. In such embodiments, the operation of the smartcup tag and the dispensing system is the same, however, a user may be asked to place a cup into a dispensing position for the dispenser before or after swiping the separate portable item comprising the smartcup tag near a smartcup reader. Additionally, the portable item may comprise a visual identifier that can be associated with a user account as described herein in reference to the smartcup. Thus, some embodiments may use other portable items with an embedded smartcup tag and a visual identifier with a regular cup instead of using the smartcup as described herein.

The smartcup tag may include information that can be used to identify an account as well as information that provides security features. For example, a smartcup tag 111 may include a static smartcup tag unique identifier and a re-writable security token. The smartcup tag unique identifier may not be unique to all smartcup tags but may be unique to the dispenser and smartcup network computer 130 and the associated dispenser and smartcup entity database 131. Thus, no two smartcup tags 111 (and corresponding smartcups) registered with the dispenser and smartcup network computer 130 may have the same smartcup tag identifier. The smartcup tag reader/writer may be configured to read the smartcup tag unique identifier and the security token as well as write an updated security token into the smartcup tag data storage area for the re-writable security token. Thus, a smartcup tag 111 may store a static value and a re-writable value that may be used to identify, validate, and authenticate a smartcup 110.

The smartcup tag reader/writer may include any suitable device that is configured to read data from a smartcup tag 111. For example, the smartcup tag 111 and smartcup tag reader/writer may implement radio frequency identification (RFID) technology. Radio-frequency identification (RFID) includes the wireless use of electromagnetic fields to transfer data, for the purposes of automatically identifying and tracking tags attached to objects. The tags may contain electronically stored information that can be stored, read, and re-written by RFID tag readers/writers, depending on the configuration of the tags and the readers/writers. Some tags are powered by electromagnetic induction from magnetic fields produced near the reader. Some tag types collect energy from the interrogating radio waves and act as a passive transponder. Other types have a local power source such as a battery and may operate at much longer distances from a reader. An RFID tag does not necessarily need to be within line of sight of the reader to communicate, and may be embedded in the tracked object. Further, the tags may be embedded and/or integrated within the tracked item through any suitable method. For example, in some embodiments, the tag may be attached to a product while in others the tag may be integrated and/or embedded into the product during manufacturing such that it is not removable or is difficult to remove without damaging the item.

RFID systems may include different types of tags and readers and the smartcup tag system may implement any such configuration. For example, RFID systems may implement a Passive Reader Active Tag (PRAT) system which has a passive reader which only receives radio signals from active tags (battery operated, transmit only), an Active Reader Passive Tag (ARPT) system which has an active reader, which transmits interrogator signals and also receives authentication replies from passive tags, and an Active Reader Active Tag (ARAT) system which uses active tags awoken with an interrogator signal from the active reader. Similarly, a Battery-Assisted Passive (BAP) tag may also be used which acts like a passive tag but has a small battery to power the tag's return reporting signal. In most embodiments, a smartcup tag and smartcup reader system may include an active reader passive tag (ARPT) implementation in order to keep costs for the smartcup tags minimal due to the limited use and limited time that a smartcup may be used. However, note that systems could be developed using any type of RFID technology and/or any other communication technology that allows for reading and writing to tags in a smartcup at the distances needed for beverage dispensers. Additionally, the smartcup tag and reader system may implement other non-RFID technology and is not limited to such embodiments. For example, any technology that allows for reading and writing of a unique identifier and a dynamic security value to a container may be implemented for the smartcup tag and smartcup reader system (e.g., Bluetooth™, laser based systems, etc.).

A smartcup 110 may include any container that includes one or more unique identifiers that allows the container to be uniquely identified by an entity or system. For example, a smartcup may allow a beverage dispenser 120, beverage provider, smartcup manufacturer/provider, and/or any other entity associated with the smartcup to uniquely identify, verify, and/or authenticate the smartcup 110. For instance, a smartcup 110 may include a smartcup tag 111 that is configured to interact with a smartcup tag reader/writer. Further, a smartcup 110 may include a visual identifier 112 (and/or visual code) that allows the smartcup 110 to be identified by other smartcup readers that are not limited to tag readers. For example, a Data Matrix™ barcode, a QR Code™, an alphanumeric string of characters, a unique graphic, or other visual identifier may printed or displayed on the smartcup 110 (e.g., on the outside surface of the smartcup 110) to allow a visual detector or visual reader (e.g., camera with associated processor) to capture the visual identifier 112 and decode or otherwise process the captured visual identifier to identify the smartcup 110.

A smartcup tag 111 may include any data carrying element that is configured to store and provide data to a smartcup tag reader. The smartcup tag 111 may be configured to allow data to be written to the smartcup tag 111 and read from the smartcup tag 111. The smartcup tag 111 may include any amount of information. For example, in some embodiments, the smartcup tag 111 may include a unique smartcup tag identifier (also referred to as a "smartcup identifier") and a security token (also referred to as a "dynamic token," "dynamic security token," and/or "dynamic value"). In some embodiments, the unique smartcup identifier may be a static value that is unique to the smartcup 110. For example, the unique smartcup identifier could be a 32 bit randomly generated value that is generated such that it will be unique to the smartcup 110. However, a smartcup identifier may include any number of bits that allows for a sufficient number of unique smartcup identifiers for the system being implemented and requirements of the smartcup provider and/or smartcup application provider (e.g., the number of issued smartcups may determine how many bits in each identifier).

A dispenser and smartcup network computer (DSNC) 130 may include any computer configured to route, facilitate, translate, and/or process communications between a beverage dispenser 120 and any application computer, such as but not limited to a dispenser and smartcup application computer 140. The DSNC 130 may be configured to communicate with many different beverage dispensers 120A-120E and may create a network of different beverage dispensers (i.e., a beverage dispenser network) that are configured to communicate with the DSNC 130. The DSNC 130 is configured to authenticate and validate the authenticity and use conditions of smartcups presented at a beverage dispenser and provide authorization to dispense a beverage at the beverage dispenser. Additionally, the DSNC 130 may allow communication between smartcup providers, smartcup application providers, beverage providers, smartcup manufacturers, merchants, and any other relevant parties and a beverage dispenser 120 from the network of beverage dispensers 120A-120E. For example, the network of beverage dispensers 120A-120E may be configured to interface with the DSNC 130 to communicate dispense information and obtain consumer profile information from application computers and/or partner computers associated with the beverage dispensers 120A-120E. For example, a dispenser and smartcup application computer (DSAC) 140 may be implemented by a beverage supplier, a merchant, and/or a smartcup manufacturer such that the beverage dispenser 120 may report beverage consumption and activity to the DSNC 130 which may then report and/or otherwise send dispensing information to any application computer (e.g., DSAC) implemented by or associated with, for example, a beverage dispenser, manufacturer, merchant, etc.

The dispenser and smartcup entity database (DSED) 131 may include any information that allows the DSNC 130 to validate the authenticity of the smartcups, consumer information associated with a registered smartcup tag identifier, and interface with a dispenser and smartcup application computer (DSAC) in order to provide an enhanced user experience and more secure beverage dispenser system. For example, the DSED 131 may include a registry of unique smartcup tag identifiers, beverage dispensers, DSACs 140A-140C, domain information associated with each DSAC 140 to ensure the proper access to the dispense information associated with each DSAC, and any other information that may be helpful in authorizing beverage dispensing events and facilitating communications between a beverage dispenser 120 and a DSAC 140. For example, the DSED may include different information domains which provide different access rights to information stored in the DSED based on the domain associated with a particular dispenser and smartcup application computer (DSAC) 140. Thus, the DSNC may service various different DSACs while maintaining the data security of the smartcup dispenser network and the stored dispense information by only providing access to information that is associated with a DSAC's registered domain.

Although embodiments show a dispenser and smartcup network computer (DSNC) 130 and dispenser and smartcup entity database (DSED) 131, note that similar functionality may be provided through the use of application program interface (API) commands evoked or used by any DSAC 140 and beverage dispenser 120. Accordingly, embodiments are not limited to the use of the DSNC 130 as shown and other configurations may be implemented where the functionality of the DSNC 130 is implemented at the beverage dispenser 120 and/or the DSAC 140. Additionally, the functionality of the DSNC could be implemented at a beverage dispenser 120 and/or by another computer in a local network with the beverage dispenser 120. Thus, some embodiments may be implemented when beverage dispensers directly communicate with smartcup application providers and vice versa.

A dispenser and smartcup application computer (DSAC) 140 may include any computer or series of computers that are configured to manage registered consumer information associated with smartcups and beverage dispensers. The DSAC 140 may be deployed and/or managed by a beverage supplier (e.g., Syrup Supplier), a merchant or activity provider (e.g., grocery store, theme park, school cafeteria supplier, etc.), a smartcup manufacturer or smartcup provider, and/or any other entity that has an interest in managing and tracking consumer information associated with beverage dispenser 120 and smartcup interactions. The DSAC 140 may include a processor and a computer-readable medium including code, executable by the processor, for performing the functionality described herein.

Note that although embodiments of the present invention are directed toward beverage dispenser systems and network communications with a smartcup application provider, embodiments are not limited to such applications. For instance, one of ordinary skill could implement any other similar product dispenser using the concepts described herein. For example, similar features and functionality could be applied to an automobile liquid dispenser system (e.g., oil lube, window washer fluid, etc.), food preparation system (e.g., pizza sauces, etc.), and any other environment where consumers may register profiles, obtain dispensed products at a point of distribution, and where the customer experience could be enhanced by identifying customer preferences from previous dispensing interactions with the customer, monitoring use through consumption tracking, etc.

Figure 2:
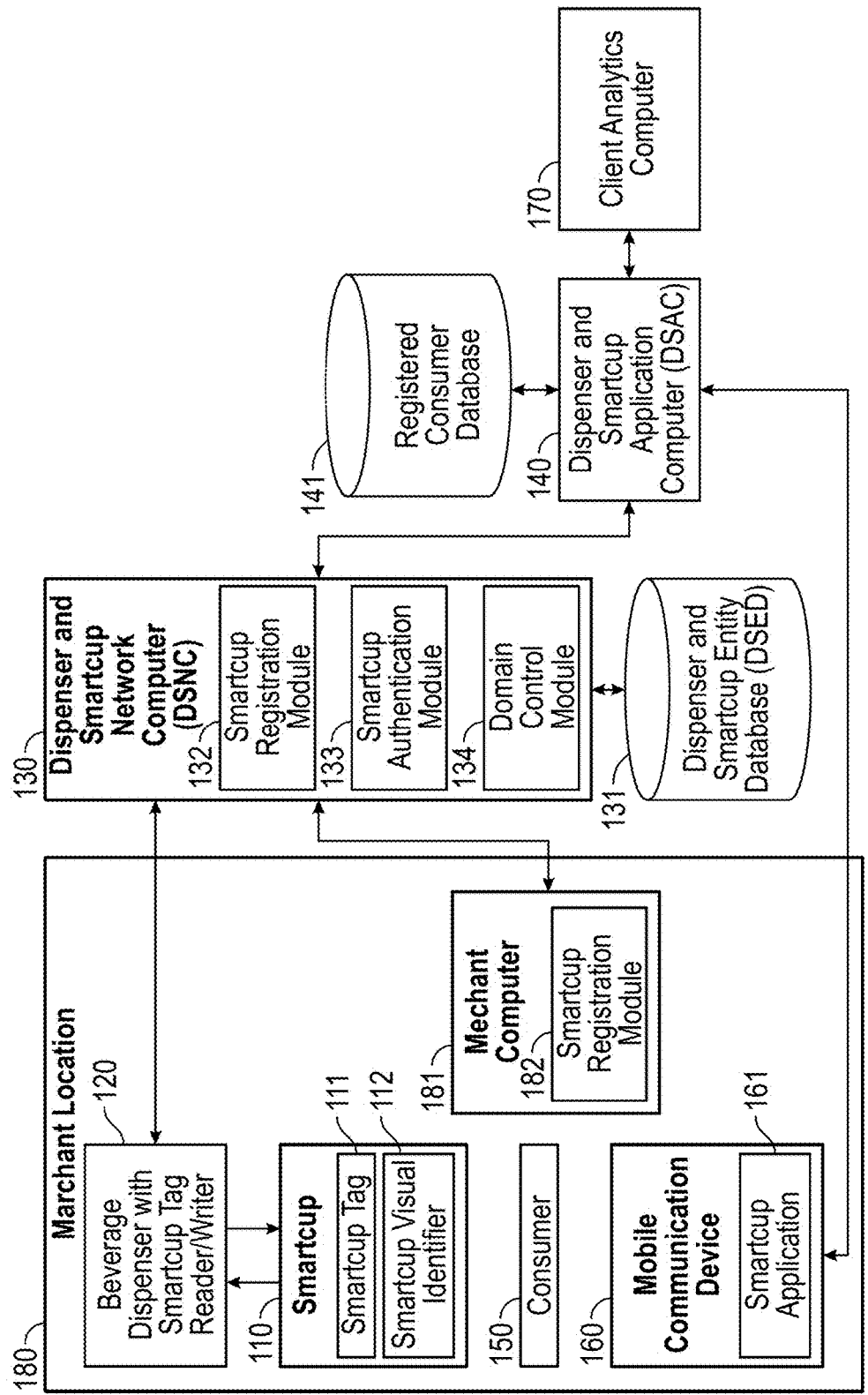
FIG. 2 diagrammatically illustrates a smartcup identifier, verification, and beverage dispense system, according to one embodiment of the present invention.

FIG. 2 diagrammatically illustrates a system for a smartcup tag identifier, verification, and beverage dispense system 100, according to one embodiment of the present invention. The smartcup beverage dispenser system may include a smartcup 110, a beverage dispenser with a smartcup tag reader/writer 120, a dispenser and smartcup network computer (DSNC) 130, a dispenser and smartcup application computer (DSAC) 140, a consumer 150, a mobile communication device 160, a client analytics computer 170, and a merchant computer 181.

A smartcup 110 may include any container that includes one or more unique identifiers that allows a beverage dispenser 120, beverage provider, and/or any other entity associated with the smartcup to uniquely identify, verify, and/or authenticate the smartcup. For example, a smartcup may include a smartcup tag 111 and a smartcup visual identifier 112.

A smartcup tag 111 may include any data carrying element that is configured to store and provide data to a smartcup tag reader. The smartcup tag may allow data to be written to the smartcup tag and may allow data to be read from the smartcup tag. In some embodiments, the data stored in the smartcup tag may be stored in an encrypted form and shared encryption keys between readers/writers and tags may be used to cryptographically secure data during transmission between a smartcup tag and a smartcup reader.

The smartcup tag may include at least a unique smartcup identifier and a security token. In some embodiments, the unique smartcup identifier may be a static value that is unique to the smartcup (within the DSNC 130). For example, the unique smartcup identifier could be a 32 bit alphanumeric value that uniquely identifies a smartcup registered within the DSNC 130 and is associated with a corresponding DSAC 140 and/or smartcup provider.

In some embodiments, the unique smartcup identifier may be generated according to a preconfigured standard and/or protocol such that the smartcup tag identifier includes information that may be used to identify a specific smartcup identifier provider, type of smartcup, dispensing mode associated with a smartcup, merchant associated with the smartcup, and/or any other relevant information associated with the smartcup tag and/or smartcup. For instance, the smartcup tag identifier may include n bits where the first k bits include a header which identifies the version of the protocol and identify the tag as a smartcup tag, the next m bits identify the dispensing provider (e.g., DSNC 130), and the last p bits are a unique serial number for the smartcup tag. Thus, the smartcup tag identifier may be registered as a key to uniquely identify a dispensing provider (e.g., DSNC 130) associated with smartcup, the type of smartcup, and any other relevant information about the smartcup from the unique smartcup identifier.

A smartcup visual identifier may include any perceivable data that uniquely identifies a specific smartcup. The relationship between the smartcup visual identifier and the smartcup tag identifier may be stored by the DSNC 130 during a smartcup registration process. For instance, the DSNC 130 may maintain a dispense and smartcup entity database (DSED) 131 that stores the relationship between a smartcup visual identifier and a smartcup tag identifier. Smartcup visual identifiers may include any suitable unique value that allows any device configured to read the visual identifier (e.g., a mobile device 160, a beverage dispenser 120, etc.) to identify the smartcup based on visual capture and/or visual processing. For example, the smartcup visual identifier may include a computer readable value such as a Data Matrix™ barcode, a QR Code™, or other computer readable value, data string, alphanumeric code, token, graphic, or any other value that is associated with a smartcup.

A dispenser and smartcup network computer (DSNC) 130 may include any computer including a processor and a computer-readable medium comprising code, executable by the processor, for implementing functionality including software modules that perform the functionality described herein. For example, the DSNC 130 includes a smartcup registration module 132, a smartcup authentication module 133, and a domain control module 134.

The smartcup registration module 132 is configured to allow the DSNC to interface with a smartcup manufacturer (not shown) or other smartcup provider in order to register smartcups with the DSNC and/or one or more DSACs. The smartcup registration module may be configured to allow for bulk or piece-meal registration of smartcups. For example, a smartcup manufacturer may send a bulk registration request to the DSNC after manufacturing the smartcups, writing the smartcup information (e.g., smartcup tag identifier, dynamic security token) to the smartcup tag 111, and/or printing the smartcup visual identifier 112 on the smartcup body. Further, the smartcup registration module may allow a merchant computer 181 to update and/or alter the registered smartcup information within the DSED 131. For example, a merchant may sell additional refills and/or update the number of refills available for a smartcup and may use the merchant computer 181 to communicate the updated smartcup identifier information to the DSNC 130. The smartcup registration module 132 may authenticate the merchant to ensure the merchant is authorized to update registered information for the smartcup tag identifier and may update the DSED 131 with the updated information.

The smartcup authentication module 133 includes a software module that is configured to receive smartcup authentication requests, validate the authenticity and status of a smartcup tag identifier, authorize a dispense event, and provide consumer information to a beverage dispenser for a dispense event. The smartcup authentication module 133 may interface with the DSED 131 to obtain smartcup information, validate use conditions associated with the smartcup, obtain personal information, and obtain any other relevant information.

The domain control module 134 includes any software module that is configured to ensure the permissions of any entity attempting to access information or interact with the DSNC 130. For example, the domain control module 134 may use a registered identifier of an DSAC 140 to determine what information stored within the DSED 131 that the DSAC 140 is allowed to access. For example, a DSAC 140 may only be able to access smartcup information for smartcups that they have manufactured, issued, and/or are responsible for managing. Thus, when smartcups are registered with the DSNC 130, a domain identifier may be registered with the smartcup information. The domain identifier may indicate which entities are allowed to access that information. Domain identifiers may be shared with multiple entities or may be specific to a particular entity. For example, a merchant may only be able to access information for smartcups that were issued by the merchant while a syrup supplier may be able to access smartcup information associated with any merchants that they provide syrup to. Thus, the access rights or permissions associated with the merchant may include only a single domain while the access rights associated with the syrup supplier may include multiple different domain identifiers (e.g., one for each merchant that issues or accepts smartcups). Thus, when a DSAC 140 requests information associated with a particular smartcup identifier, the domain control module 134 may validate that the domain identifier associated with the requested smartcup match the access permissions (i.e., the domain identifiers) that are associated with the DSAC 140.

A dispenser and smartcup entity database (DSED) 131 may include any data storage medium that stores information associated with issued and/or managed smartcups of a DSNC 130. In some embodiments, when smartcups are manufactured and/or issued, the code or value associated with a smartcup visual identifier, a smartcup tag identifier, and a security token may be stored in the DSED 131 such that a specific smartcup may be identified by any one or a combination of the smartcup related identifiers. The DSED may also include any other information that may be useful in authenticating, validating, and authorizing beverage dispenses as well as any information useful for communicating with a beverage dispenser 120 or beverage network computer. Further, registered consumer profile information and any other information related to providing a personalized or enhanced user interaction may be stored in the DSED 131 as well. For example, access privilege information including the domain for each smartcup entry may also be included in the DSED 131 which indicates what entities may access and update information associated with each particular smartcup entry. An exemplary query result showing exemplary values that may be stored within the dispenser and smartcup entity database 131 is shown in FIG. 3. Note that the values are illustrative only and any relevant values may be used and such values are not limited to those types shown in FIG. 3.

As shown in FIG. 3, a DSED 131 may include dispenser and smartcup entity database 131 entries that include any relevant information associated with each smartcup tag identifier registered with the DSNC 130. For example, each of the DSED 131 entries may include smartcup validation information including a smartcup tag identifier, a dynamic security token, and a smartcup visual identifier associated with the smartcup. Additionally, the DSED 131 may include a dispense mode setting and use conditions associated with the smartcup including a number of available dispenses for the smartcup, an available dispense volume for the smartcup, an expiration date for the smartcup, and/or an expiration time for the smartcup. The dispense mode settings may include, for example, a time limit, a number of dispenses, and a dispense volume. Further, the DSED 131 may include user information including a user identifier associated with the smartcup and a preferred beverage field that indicates the preferred beverage of the consumer based on prior dispenses and/or a user setting. Thus, the DSNC 130 may have access to any information that has been stored, tracked, and/or associated with a registered smartcup and/or associated consumer profile from a registered consumer database of a DSAC 140. Additionally, the DSED 131 may include domain identifier information for each smartcup entry such that the domain control module 134 of the DSNC 130 may determine whether a requestor (e.g., DSAC 140) should be given access to smartcup information.

A registered consumer database 141 may include any data storage medium including any information related to a registered user of the smartcup application. For example, the registered consumer database 141 may include any registered consumer consumption information, beverage dispense information, user profile information, registered smartcup information, and any other information associated with a user or tracked smartcup. An exemplary query result of a registered consumer database 141 is shown in FIG. 4 with exemplary values. Note that the values are illustrative only and any relevant values may be used and such values are not limited to those types shown in FIG. 4.

As shown in FIG. 4, the registered consumer database 141 may include entries that include any relevant information to a user registered with the DSAC 140. For example, the registered consumer database 141 may include a consumer name, a user identifier, associated smartcup visual identifier, associated smartcup tag identifier, dynamic security token, product dispensed identifier, volume dispensed, preferred drink associated with the user identifier, a dispense time and/or date, and a beverage dispenser 120 location. As such, the registered consumer database 141 may include entries for each dispense (as shown in FIG. 4). Additionally and/or alternatively, the registered consumer database 141 may include aggregated information about each registered user and their historical dispenses, preferred beverages, and any other relevant information that is available from the DSNC 130 and/or to the DSAC 140 associated with a registered user.

Returning to FIG. 2, a consumer 150 may include any purchaser, owner, or user of a smartcup and/or beverage dispenses associated with the smartcup (i.e., re-fills). The consumer may be registered or unregistered. Registered consumers may operate a mobile communication device (e.g., mobile phone) with a smartcup application operating on the mobile communication device in order to register and monitor their smartcup account, remaining dispenses or other use conditions, and any other relevant information associated with the smartcups.

A mobile communication device 160 may include any portable device that is configured to communicate with remote server computers. The mobile communication device 160 may include a smartcup application 161 that allows a user to communicate with the dispenser and smartcup application computer (DSAC) 140 to associate a smartcup with their registered consumer account and otherwise interact with the DSAC 140 to obtain information regarding a registered user profile or smartcup. The mobile communication device 160 may include a processor and a computer-readable medium comprising code, which when executed by the processor, is configured to perform any of the functionality described herein.

A client analytics computer 170 may include any computer or series of computers that are configured to interface and/or communicate with the dispenser and smartcup network computer (DSAC) 140. For example, the client analytics computer 170 may be associated with a merchant and/or may be associated with a supplier or other interested party to the consumption and use information for the smartcup system. The client analytics computer 170 may allow an analyst associated with the DSAC 140 or beverage supplier to analyze use characteristics, registered consumer information, dispense information obtained provided by the DSED 131, and/or any other information available to the DSAC 140. The client analytics computer 170 may allow an analyst (not shown) to obtain additional detailed information regarding consumer usage, history, marketing profiles, etc. in order to service, market, and/or provide information to beverage suppliers, buyers, marketers, or any other entities associated with a beverage dispenser 120 and/or DSNC 130.

A merchant computer 181 may include any computer configured to interface with a DSNC 130 to issue, register, and/or update smartcup information stored at the DSED 131. The merchant computer may include a point-of-sale (POS) or other merchant terminal for performing payment transactions and the payment transaction may include a step of updating the DSNC 130 with updated smartcup information using a smartcup registration module 182 after a payment is authorized and a transaction is completed. Accordingly, the merchant may perform a transaction with the consumer 150 to obtain additional refills for the smartcup and the smartcup registration module 182 of the merchant computer 181 may communicate with the DSNC 130 to update the smartcup information stored in the DSED 131 to reflect the purchase information (e.g., add 2 refills, 30 minutes, etc.) to a registered smartcup tag identifier.

Further, in some embodiments, the merchant computer 181 may be configured to update smartcup information associated with a user and/or obtain information regarding a smartcup. For example, the merchant client computer may be configured to update a number of refills associated with a smartcup identifier, may be able to track how many refills remain for a smartcup, and/or may monitor use statistics of the beverages to assist in inventory and deliveries of beverages.

II. SmartCup User Association Methods

Figure 5:
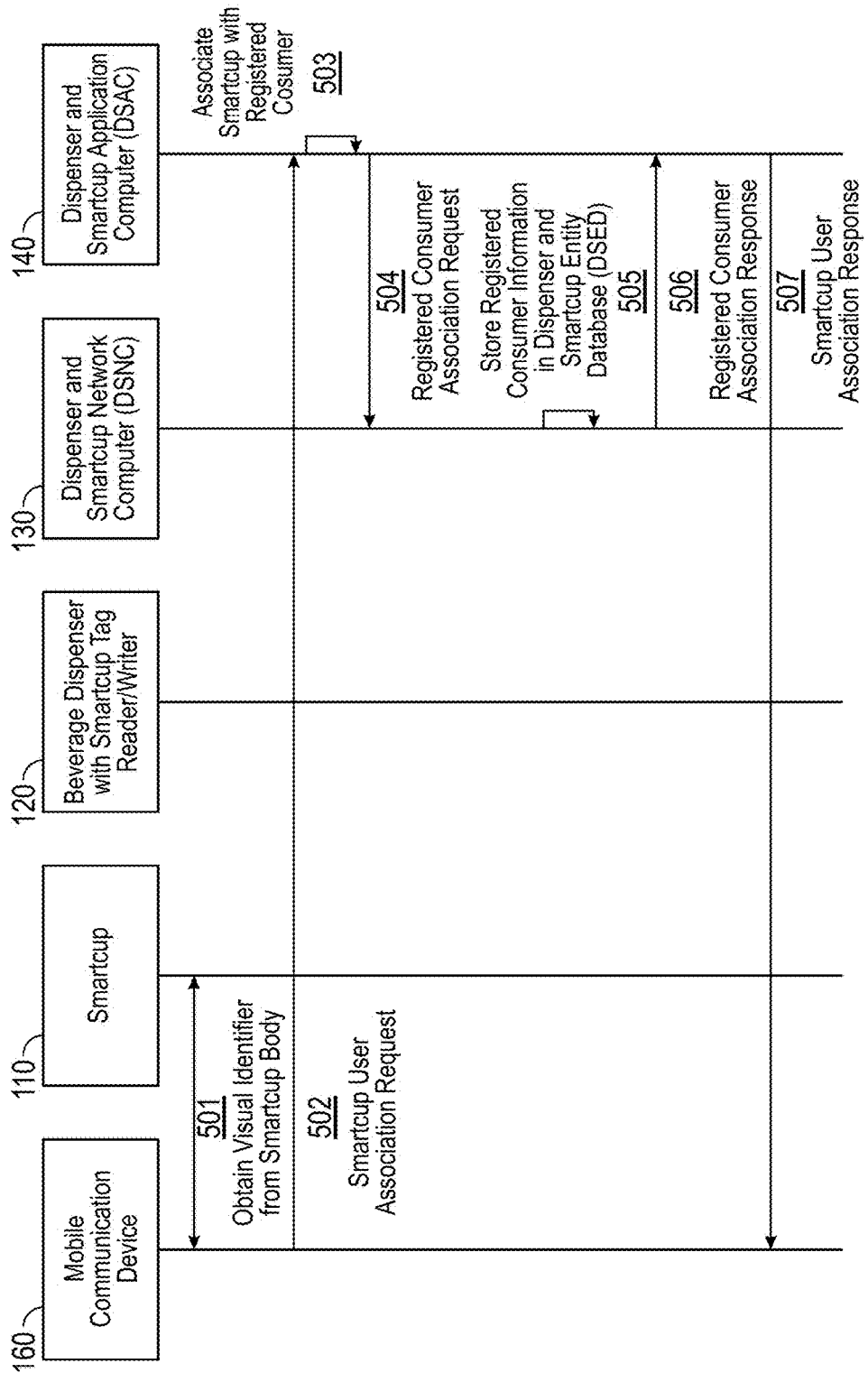
FIG. 5 diagrammatically illustrates a method of enrolling a smartcup with a registered consumer profile, according to an exemplary embodiment of the present invention.

FIG. 5 shows an exemplary user association flow diagram of a method for associating a registered smartcup tag identifier with a registered user profile. In some embodiments, a registered user may use their mobile communication device 160 and/or other computer to associate a smartcup with their registered user profile. Smartcup user association may occur through any suitable method in order to associate a smartcup visual identifier 112 and/or smartcup tag 111 with a registered user profile stored at the DSAC 140. The method described below is one exemplary method of associating a smartcup 110 with a user profile.

Before the method of FIG. 5 begins, a user may have bought a smartcup 110 and a number of dispenses, time limit, and/or volume of dispenses from a merchant or other beverage provider. The smartcup tag identifier, visual identifier 112, and dynamic security token may have previously been registered with the DSNC 130 when the smartcup was manufactured or sold to the merchant or other DSAC 140 operator. Accordingly, the DSNC 130 may have the smartcup identification information previously stored in a DSED 131 at the DSNC 130. As such, once a smartcup is sold to a consumer by a merchant, the merchant (or smartcup provider) may load the smartcup with a number of dispenses, a time limit, and/or other use conditions (or the smartcup could be provided with a preconfigured number of dispenses, time limit, and/or other use conditions). The registration information may be sent to the DSNC 130 which updates the DSED 131 with the use conditions associated with the smartcup 110. Furthermore, the consumer may download and install a smartcup application 161 on their mobile communication device 160 that allows the mobile communication device 160 to communicate with the DSAC 140. Accordingly, a registered consumer 150 may have possession of a valid smartcup 110 and a mobile communication device 160 configured to communicate with a DSAC 140 allowing the association between the smartcup identifier and the registered user.

Figure 10:
FIG. 10 is an illustrative screenshot of the graphical user interface of a smartcup application during a smartcup registration, according to an exemplary embodiment of the present invention.

At step 501, the mobile communication device obtains the visual identifier from the smartcup. Any suitable method of capturing and/or obtaining the visual identifier may be used depending on the type of smartcup visual identifier and the capabilities of the mobile communication device 160. For example, the mobile communication device 160 may take a picture of a QR Code™ or other computer-readable code (e.g., Data Matrix™ Barcode) and may process the image using a smartcup visual identifier processor module of the smartcup application 161 installed on the mobile communication device 160 to identify a smartcup visual identifier embedded or otherwise associated with the QR Code™ or other computer-readable identifier. Alternatively and/or additionally, in some embodiments, the mobile communication device 160 may take a picture of a data string and use optical recognition software to determine the visual identifier. Further, in some embodiments, a user may read the visual identifier and manually enter the visual identifier into the smartcup application operating on the mobile communication device 160. FIG. 10 shows an exemplary graphical user interfaces for the smartcup application registration screen for obtaining a visual identifier from the smartcup 110.

At step 502, the mobile communication device 160 generates and sends a smartcup user association request to the dispenser and smartcup application computer (DSAC) 140. The smartcup user association request may include the determined smartcup visual identifier, a username and/or user identifier associated with the registered user, and any validation information that allows the DSAC 140 to validate the registered user and/or authenticate the request (e.g., a password, a security authentication token, etc.).

At step 503, the DSAC 140 validates the request and registers the smartcup as being associated with the registered consumer profile of the user. For example, the DSAC 140 may parse the user identifier and the smartcup visual identifier from the smartcup user association request, search the registered consumer database 141 for a user profile associated with the user identifier, validate that the identified user profile is active and in good standing, and update the registered consumer database 141 to indicate that the smartcup associated with the received smartcup visual identifier is associated with the registered user profile and vice versa. Accordingly, from this point forward, the DSAC 140 may associate the smartcup visual identifier 112, smartcup identifier associated with the smartcup tag 111, and any other information associated with the smartcup identifier that is stored at the registered user profile database 141 as being associated with the registered user profile of the user.

At step 504, the DSAC 140 generates and sends user profile information to the DSNC 130 to inform the DSNC 130 of the relationship between the registered consumer and the smartcup visual identifier. The user profile information may be sent in a registered consumer association message. The registered consumer association message may include an identifier of the DSAC 130, the smartcup visual identifier 112 received in the user association request received from the mobile communication device 160, and the consumer profile information to be associated with the smartcup at the DSNC 130. The user profile information may include any relevant information from the registered consumer database 141. For example, the user profile information may include a user identifier, a consumer name, a preferred beverage selected by the registered consumer, a mobile device identifier or phone number, or any other relevant information that may be useful for the DSNC 130.

At step 505, the domain control module 134 of the DSNC 130 parses the smartcup visual identifier 112 from the registered consumer association message and searches the DSED 131 for a smartcup entry that matches the received smartcup visual identifier. If the domain control module 134 of the DSNC 131 finds a relevant smartcup entry in the DSED 131, the domain control module 134 determines whether the DSAC 140 has access rights and/or permission to access and update information associated with the smartcup entry stored in the DSED 131. For example, the domain control module may determine a domain associated with the matching smartcup entry and compare the domain to the access privileges of the DSAC 140.

Access privileges may be granted and controlled through any suitable method. For example, access privileges may be separated into domains, clients, and categories where each DSAC 140, merchant computer 181, and/or any other entity accessing the DSNC 130 is provided access to different domains, clients, and categories during a registration phase with the DSNC 130. Domain access privileges may allow an entity access to information associated with all of the clients and categories within that domain. Client access privileges may allow an entity access to the various categories within a particular client of a particular domain. The lowest level of access privileges may include the categories which give an entity access to designated categories of information within each client of a domain. No entities may be provided with access to all of the domains other than the DSNC 130 itself. Thus, an entity (e.g., a merchant, a merchant computer 181 at a particular location, a DSAC 140, etc.) may be given access to that information in which they have been registered to have access rights and may update information for those smartcups in which have been registered to have access to.

Thus, the domain control module 134 of the DSNC 130 may determine the access rights of the particular DSAC 140 requesting the registered user association with the smartcup visual identifier and may determine whether the DSAC 140 is associated with a particular domain, client, and/or category in which the smartcup visual identifier falls. For example, if the DSAC 140 is associated with a syrup distributor that supplies syrup to a chain of merchants, the syrup distributor may be given domain access rights to obtain and update smartcups that are registered as being associated with the particular merchant. Thus, when the smartcups are registered with the DSNC 130, the smartcups may be given a domain identifier or client identifier that is specific to the merchant they are being distributed to. The DSAC 140 of the syrup distributor would then be registered as having domain access rights and/or client access rights associated with the merchant. The domain control module 134 may then determine that the DSAC 140 has access rights to the smartcup entry identified by the smartcup visual identifier 112 and may allow the requested registered consumer association request. Thus, the domain control module 134 may update the DSED 131 with the registered consumer information contained within the registered consumer association request.

At step 506, the DSNC 130 may generate and send a registered consumer association response message to the DSAC 140. The registered consumer association response may include an indication as to the success of associating the registered consumer information with the smartcup associated with the smartcup visual identifier as well as any other relevant information to the DSAC 140. For example, the registered consumer association response may include the previous dispense information associated with the identified smartcup as well as the current status of the smartcup and any use conditions, dispense mode, and/or any other information regarding the smartcup that is stored in the DSED 131. In some embodiments, the type of information that is returned depends on the domain access rights of the DSAC 140 and/or other registration information associated with the DSAC 140.

Figure 9:
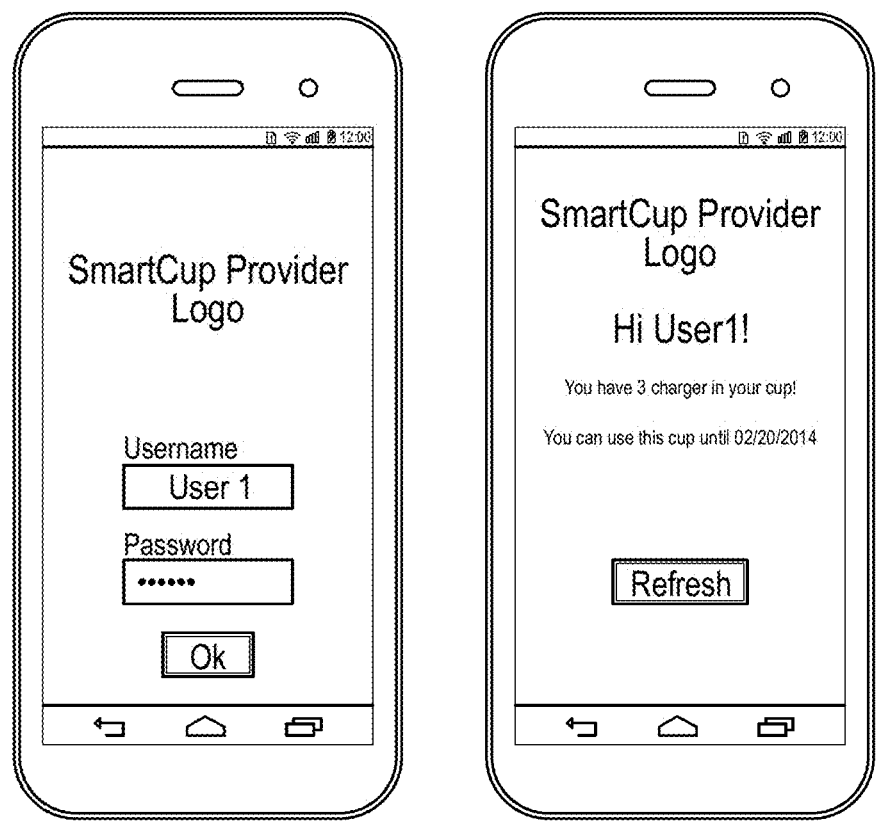
FIG. 9 includes two illustrative screenshots of the graphical user interface of a smartcup application during user log-in and smartcup status update, according to an exemplary embodiment of the present invention.

At step 507, the DSAC 140 may generate and send a smartcup user association response to the mobile communication device 160 that indicates whether the user association request was successful. If the user association was successful, the smartcup user association response may also provide a current status and other information associated with the smartcup and/or the user profile that was obtained from the registered user association response. For example, FIG. 9 shows a couple exemplary graphical user interfaces for the smartcup application where the first picture on the left shows a user logging into their registered account through the smartcup application 161 of the mobile communication device 160 and the picture on the right shows a graphical user interface after a user logs in and has registered a smartcup 110 using the process described above. Similar information can be provided in response to logging in, requesting a status update for a registered smartcup, and/or any other suitable account related actions associated with a registered account.

Note that although the process described in the flow charts herein shows a request and a matching response, embodiments are not limited to such implementations. For example, all interactions between the DSNC and the DSAC may also be implemented through get and post commands or through designated request and response messages. Thus, in some embodiments, bulk registration/association messaging and unilateral or asynchronous messaging may be implemented such that there is a delay before sending a response message and/or such that no response message is provided in response to requests even though a process may be performed successfully or unsuccessfully.

Figure 6:
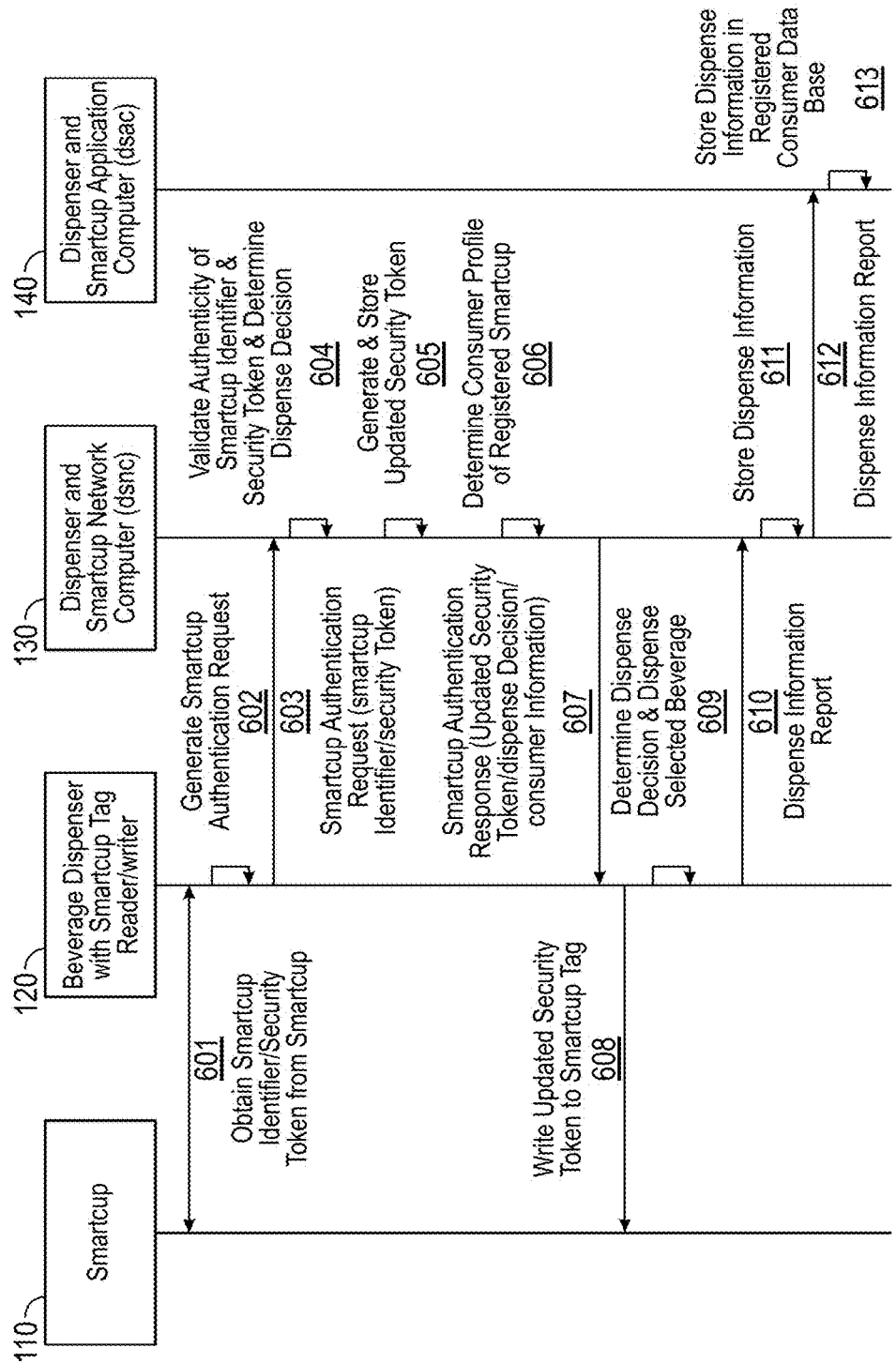
FIG. 6 diagrammatically illustrates a method of identifying, validating, and dispensing beverages using a smartcup, according to an exemplary embodiment of the present invention.

III. Methods for SmartCup Tag Identification, Verification, and Beverage Dispense FIG. 6 shows an exemplary flow diagram of a method for identifying, verifying, and dispensing a beverage according to an exemplary embodiment of the present invention. Prior to the method shown in FIG. 6, a consumer may have bought a smartcup from a merchant and, in some embodiments, may have registered the smartcup using the process described above in FIG. 5.

The consumer 150 may have bought the smartcup from the merchant and depending on the use constraints provided by the merchant, the consumer 150 may have bought the smartcup as providing unlimited refills for a period of time, a certain number of refills or dispenses, may have bought a certain amount of beverage to be dispensed, and/or any combination thereof. For example, the consumer 150 may have bought a smartcup 110 with 10 refills associated with the smartcup 110 from a theme park, a school cafeteria, a chain of restaurants, and/or any other merchant. Alternatively and/or additionally, the smartcup 110 could be allowed any number of refills for the next hour, a week, and/or any other period of time associated with an expiration date. Further, the use constraints may be combined such that, for example, a smartcup may be purchased with 5 refills that must be used within the next week. The merchant may enter the sale details into a system that communicates the details to the DSNC 130, which updates the DSED 131 to associate the use conditions with the smartcup tag identifier of the purchased smartcup 110. Thus, a consumer 150 may have an active and valid smartcup ready for use at the merchant.

The consumer 150 may then approach a beverage dispenser 120 at the merchant and may place the smartcup onto a designated area of the beverage dispenser 120 that contains a smartcup tag reader/writer. The smartcup 110 may have a smartcup tag 111 that is configured to be read and written by the placement of the smartcup tag within communication proximity to the smartcup tag reader/writer and the process shown in FIG. 6 may begin.

At step 601, a smartcup reader/writer electrically coupled to the beverage dispenser 120 obtains the smartcup tag identifier from the smartcup tag 111. In those embodiments where a dynamic security token is present in the smartcup tag 111, the beverage dispenser 120 may also obtain the security token from the smartcup tag 111. The smartcup reader/writer may obtain the smartcup tag identifier and the security token through any suitable method. For example, where the smartcup tag uses RFID technology, the reader may obtain the smartcup identifier and security token by powering a passive RFID transmitter tag and receiving the communicated data from the tag. The smartcup reader/writer is positioned within the beverage dispenser 120 such that the smartcup tag is within communication range and the tag and reader/writer may easily communicate. Alternatively, if the smartcup tag is powered with a battery, the smartcup tag reader may receive the smartcup identifier from a further distance and may start the process before the consumer places the smartcup within the designated area of the beverage dispenser 120.

At step 602, the controller of the beverage dispenser 120 generates a smartcup authentication request using the smartcup tag identifier and the dynamic security token. The smartcup authentication request may be sent using any suitable protocol that is understood and/or shared between the beverage dispenser 120 and the DSNC 130. For example, the smartcup authentication request may include a header that identifies the type of request, an identifier of the beverage dispenser 120 and/or merchant computer associated with the authentication request, the smartcup identifier, and the dynamic token.

At step 603, the dispenser network interface of the beverage dispenser 120 sends the smartcup authentication request including the smartcup tag identifier and the security token to the DSNC 130.

At step 604, the DSNC 130 receives the smartcup authentication request and begins processing the smartcup authentication request to ensure the smartcup tag identifier and the dynamic security token are valid, authentic, and to determine a dispense decision for the smartcup authentication request. First, the DSNC 130 may determine whether a registered smartcup tag exists in the DSED 131 for the smartcup tag identifier. Next, the DSNC 130 may determine whether the received dynamic security token matches the stored dynamic security token associated with the registered smartcup. Accordingly, the DSNC 130 validates the authenticity of the smartcup identifier and the dynamic security token. Next, the DSNC 130 may determine a dispense decision based on the use conditions associated with the validated smartcup. Additional details regarding the validation and dispense decision processing is provided in reference to FIG. 7 below.

At step 605, where the smartcup is authentic, the DSNC 130 may generate a new dynamic security token for the smartcup tag identifier and may update the dynamic security token stored in the DSED 131. The dynamic security token may be randomly generated and/or may be selected according to a predetermined algorithm. Either way, the DSED 131 may be updated with the updated dynamic security token and the updated dynamic security token may be sent to the beverage dispenser 120 for updating the dynamic security token stored on the smartcup tag of the smartcup. Note that in some embodiments, the updated dynamic security token may be generated and written to the smartcup tag at the beverage dispenser 120. In such embodiments, the updated dynamic token would be sent to the DSNC 130 after being successfully written into the smartcup tag by the beverage dispenser 120. The DSNC 130 would then update the relevant smartcup tag entry in the DSED 131 to include the updated dynamic security token for the transaction or read event.

At step 606, the DSNC 130 may determine whether the smartcup tag identifier has been registered and/or associated with a user and/or consumer profile. The DSNC 130 may search the DSED 131 for the smartcup tag identifier and may determine whether the associated smartcup tag identifier is associated with a user identifier and/or a consumer profile. If the smartcup tag identifier has been previously associated with a user profile identifier, the DSNC 130 may obtain consumer preferences from the DSED 131 and may include the consumer information in a smartcup authentication response in order to allow the consumer to have an enhanced interface experience with the beverage dispenser 120. For example, the consumer's name, user identifier, last dispense data, remaining beverage dispenses and/or other use conditions, and/or a preferred beverage may be provided in the authentication response for the beverage dispenser 120 to use in providing a personalized and streamlined user experience and user interface with the consumer.

At step 607, the DSNC 130 may generate and send a smartcup authentication response to the beverage dispenser 120. The smartcup authentication response may include the dispense decision, results of the authentication, and any other relevant information. For example, consumer information including consumer preferences from the consumer profile may be included as described above.

At step 608, the beverage dispenser 120 receives the smartcup authentication response including the dispense decision, the updated dynamic security token, and in some embodiments, the consumer information. The beverage dispenser 120 may parse the dispense decision, the updated dynamic token, and the consumer information and may write the updated dynamic security token to the smartcup tag of the smartcup. The updated dynamic security token may be written to the smartcup tag before the beverage is dispensed such that the smartcup may remain within communication range throughout the updating process. Thus, the updated dynamic token may be updated on the smartcup tag such that the dynamic security token read from the smartcup tag and included in the next smartcup authentication request may match the security token stored in the DSED 131 and the smartcup may be validated as being authentic.

As discussed above, in some embodiments, a smartcup authentication response may include consumer information from the registered consumer profile. The consumer information may include any relevant information to the beverage dispense event. For example, the consumer information may include a preferred beverage, a consumer name, a registered username, previous beverage dispense information, a dispense mode associated with the smartcup identifier, and use conditions associated with the smartcup identifier.

At step 609, the controller of the beverage dispenser 120 may determine the dispense decision associated with the smartcup authentication response where the dispense decision indicates whether the beverage dispenser 120 is authorized to dispense the beverage. Thus, where the beverage dispenser 120 determines that the dispense decision is affirmative, the beverage dispenser 120 may determine which beverage to dispense (may either ask the consumer or may know the selected beverage from the indicated preferred drink in the consumer preference information), and may dispense the selected beverage in the smartcup. The beverage dispenser 120 may determine whether the dispense decision is affirmative by looking for a particular flag, phrase (e.g., authorized, declined, etc.), code, and/or any other information in the smartcard authentication response.

Figure 8:
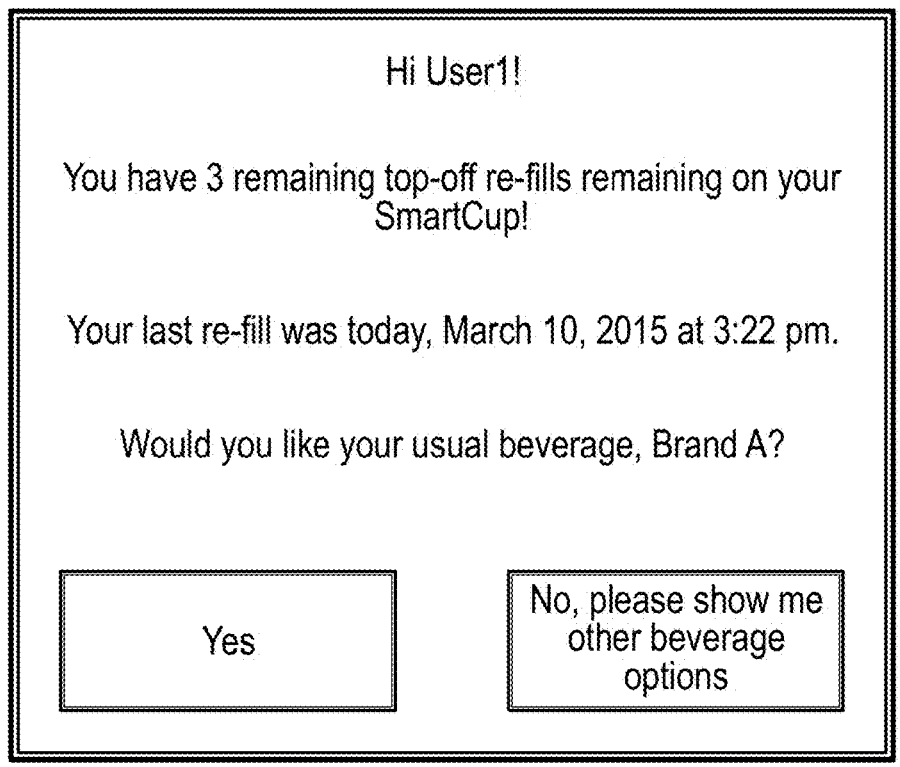
FIG. 8 is an exemplary screenshot of a graphical user interface of a beverage dispenser touchscreen after a consumer's smartcup has been identified and validated, according to an exemplary embodiment of the present invention.

The controller of the beverage dispenser 120 may obtain a selected beverage by asking a consumer for a selection, may use a preferred beverage received in the smartcup authentication response, and/or may use any other suitable method to obtain the consumer's selected beverage. For example, FIG. 8 shows an exemplary graphical user interface for a beverage dispenser 120 to obtain a selected beverage that shows an embodiment where the smartcup was registered with a registered consumer profile and consumer information is displayed to the user to offer a streamlined and personalized user interface for the consumer.

At step 610, the beverage dispenser 120 generates and reports beverage dispense information to the DSNC 130. The beverage dispense information may include any relevant information. For example, the beverage dispense report may include the selected beverage dispensed, an amount of beverage dispensed, and a time of the beverage dispense.

At step 611, the DSNC 130 receives the dispense information report and updates the dispenser and smartcup entity database (DSED) 131 to include the relevant dispense information. For example, where the use conditions are based on dispense amount, the amount dispensed may be used to update the dispense amount stored in the DSED 131. Further, if a dispense was canceled by the consumer at the beverage dispenser 120, the DSED 131 may be updated to credit a dispense to the smartcup tag identifier. The DSNC 130 may also include dispense time, a dispensed product, and any other relevant information in the update to the DSED 131 associated with the smartcup identifier.

At step 612, the DSNC 130 sends a dispense information report to the DSAC 130. As described above in reference to steps 504-506 of FIG. 5, the domain control module of the DSNC 130 may determine the access right privileges of the DSAC 140 before sending any dispense information to the DSAC 140. Any relevant information that is stored in the DSED 131 may be sent to the DSAC 140 in the dispense information report and the amount of information as may be determined based on registration settings as well as the domain controls associated with the DSAC 140.

Note that in some embodiments, the DSNC 130 may not send the dispense information report until the DSAC 140 requests updated dispense information. In such embodiments, the domain control module 134 of the DSNC 130 may receive a request from the DSAC 140, may ensure the DSAC 140 is allowed to receive dispense information for the requested smartcup using the domain identifier associated with the received smartcup identifier, and may send any updated dispense information associated with the smartcup identifier. Further, in some embodiments, the DSAC 140 may request dispense information in bulk meaning that a single request includes multiple registered smartcup identifiers that are associated with a domain of the DSAC 140. In some embodiments, the entire domain may be returned in response to a request by the DSAC 140 or periodically without a specific request. The DSAC 140 may then update the registered consumer database 141 with the updated user dispense information.

At step 613, the DSAC 140 may receive the dispense information report including the dispense information from the dispense (and possibly other previous dispenses) and updates the registered consumer database 141 to include the dispense information contained within the dispense information report.

Note that FIG. 6 shows multiple steps that are not required for every method of identifying, verifying, and dispensing a beverage according to some embodiments of the present invention. For example, in some embodiments, the identified smartcup may not have been previously registered by a registered consumer. Thus, step 608 may not be completed and no consumer preference information may be obtained and returned in the smartcup authentication response. Further, in some embodiments, the smartcup may not update a dynamic security token for every dispense and thus, the security token may not be updated and/or validated during each and every dispense. Accordingly, note that various embodiments may implement additional or fewer steps than those that are shown in FIG. 6 and/or may implement more or less functionality than shown in FIG. 6.

IV. SmartCup Authentication Methods

Figure 7:
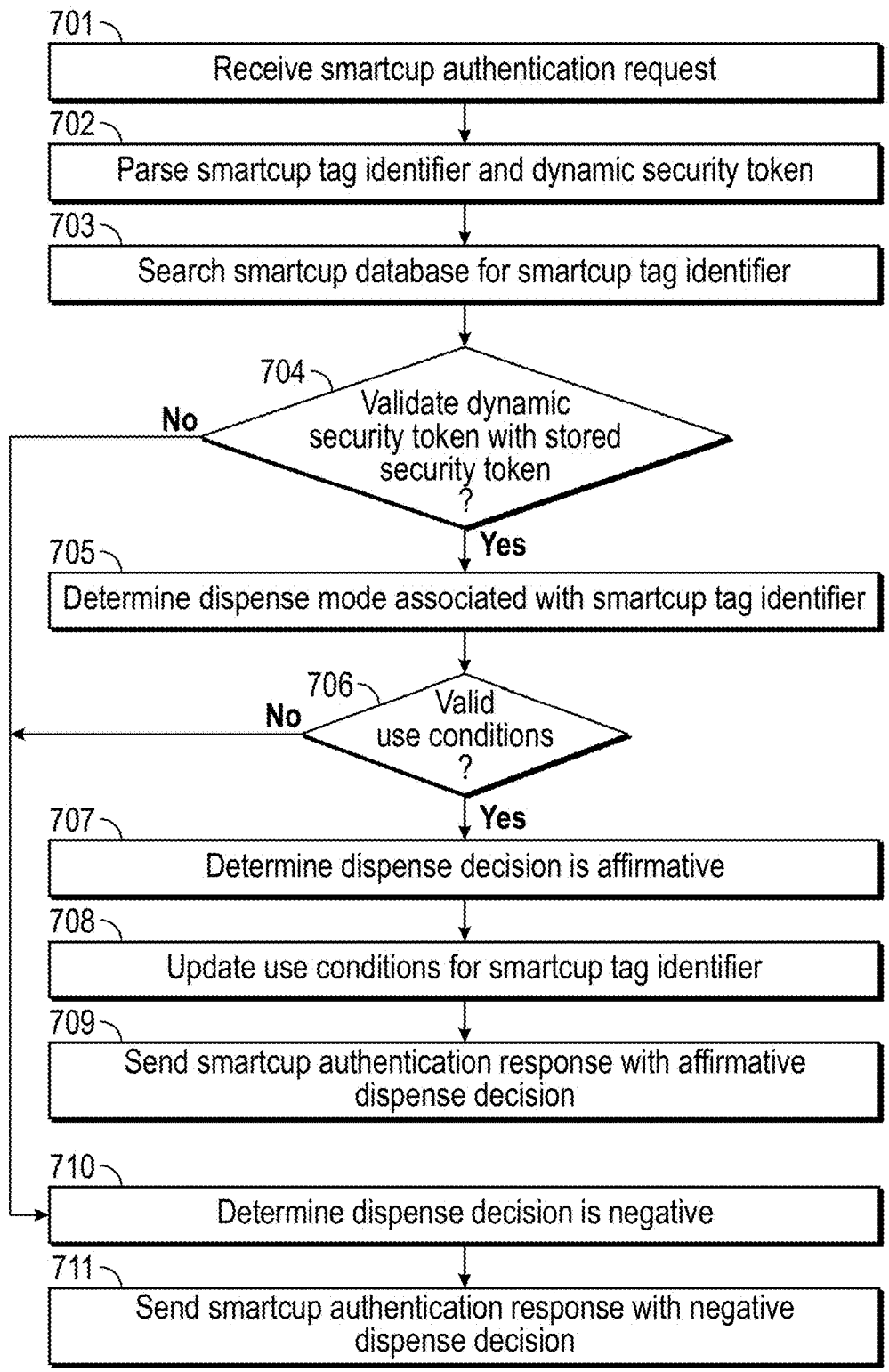
FIG. 7 diagrammatically illustrates a method of authenticating a smartcup by a smartcup application computer, according to an exemplary embodiment of the present invention.

FIG. 7 shows an exemplary flow diagram of a method for identifying and verifying a smartcup according to an exemplary embodiment of the present invention. The method described below includes one exemplary embodiment of the steps performed at step 606 of FIG. 6 described above. Additional and/or alternative methods of authentication may also be performed.

At step 701, the DSNC 130 receives the smartcup authentication request as discussed above in reference to step 606 of FIG. 6.

At step 702, the DSNC 130 parses the smartcup identifier and the dynamic security token from the smartcup authentication request.

At step 703, the DSNC 130 searches a dispenser and smartcup entity database 131 for the received smartcup tag identifier. The first validation test may be performed to determine if the smartcup identifier is associated with a registered smartcup entry stored in the dispenser and smartcup entity database 131.

At step 704, the DSNC 130 validates the authenticity of the smartcup identifier and the dynamic token by comparing the received dynamic security token to a stored security token associated with the smartcup tag identifier in the dispenser and smartcup entity database 131. Accordingly, if the received dynamic security token matches the stored dynamic token in the dispenser and smartcup entity database 131 then the smartcup is validated as being authentic. However, if the dynamic token and the security token do not match, the smartcup is not authenticated and/or validated and the processing may stop and the process may skip to step 710 where the dispense decision is determined to be negative. Thus, the beverage dispenser 120 will not subsequently dispense the beverage.

At step 705, if the authenticity of the smartcup is authenticated, the DSNC 130 determines a dispense mode associated with the smartcup identifier. A dispense mode may be associated with the type of smartcup sold to a consumer and may be used by the smartcup application to identify whether the smartcup is valid for a dispense. The various dispense modes may include, for example, a time limit, a number of dispenses, and a dispense volume. Depending on the determined dispense mode, different use conditions may be exist and the DSNC 130 may obtain different use conditions from the DSED 131.

At step 706, the DSNC 130 validates the use conditions for the smartcup authentication request. Use conditions provide the DSNC 130 an indication as to what the conditions are on the dispense mode and whether the smartcup is currently valid for a dispense and thus, that the dispense should be pursued. The use conditions may include for example, an expiration date, an expiration time, a number of dispense credits, and a remaining dispense volume. The use conditions may be determined based on how many refills are purchased, the terms associated with the smartcup when purchased, and the types of smartcups the merchant offers. The use conditions may be validated by determining whether the use conditions associated with the dispense mode are available. For example, are there any remaining number of dispenses or amount of beverage available, has the expiration time and/or date passed the present time and/or date. If so, the use conditions associated with the smartcup may be determined to be valid and the process may continue to step 707. If not, the use conditions may be determined to be invalid and the process may move to step 710. If the use conditions are determined to be invalid, a special message may be provided to let the consumer that they should approach the merchant for additional credits, time, dispense amount, etc.

At step 707, the use conditions were determined to be valid so the DSNC 130 determines that the dispense decision is affirmative.

At step 708, the DSNC 130 updates the use conditions associated with the smartcup identifier in the DSED 131 to show that an additional beverage has been used. In some embodiments, the use conditions may be updated after a dispense reporting message has been received after a dispense event. For example, the use conditions associated with an amount to dispense may be subtracted by the actual amount dispensed.

At step 709, the DSNC 130 generates and sends smartcup authentication response including the dispense decision. This step is similar to step 609 of FIG. 6.

At step 710, if the use conditions are invalid, the DSNC 130 determines that the dispense decision is negative and the authentication process stops as the smartcup is not valid for a dispense.

At step 711, the DSNC 130 sends a smartcup authentication response including the negative dispense decision. No dispense will subsequently be provided as explained above in step 706.

Figure 11:
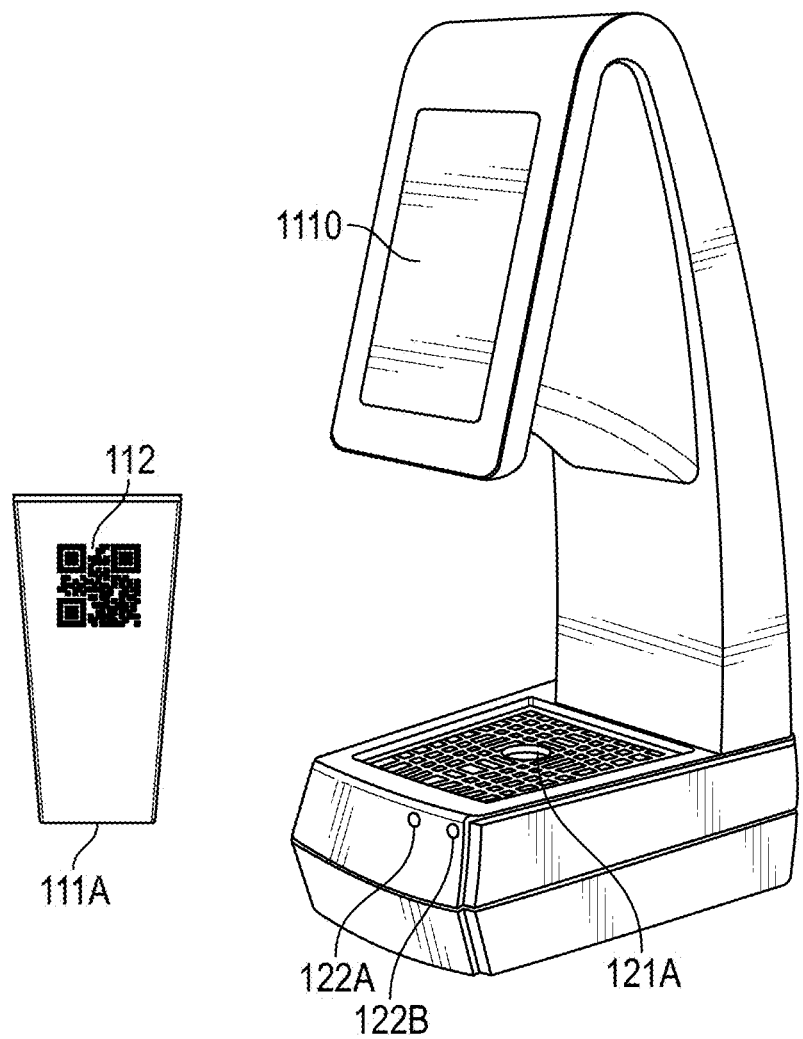
FIG. 11 is a perspective view of an exemplary reconfigurable beverage dispenser with a reconfigurable smartcup tag reader/writer in a first position.
Figure 13:
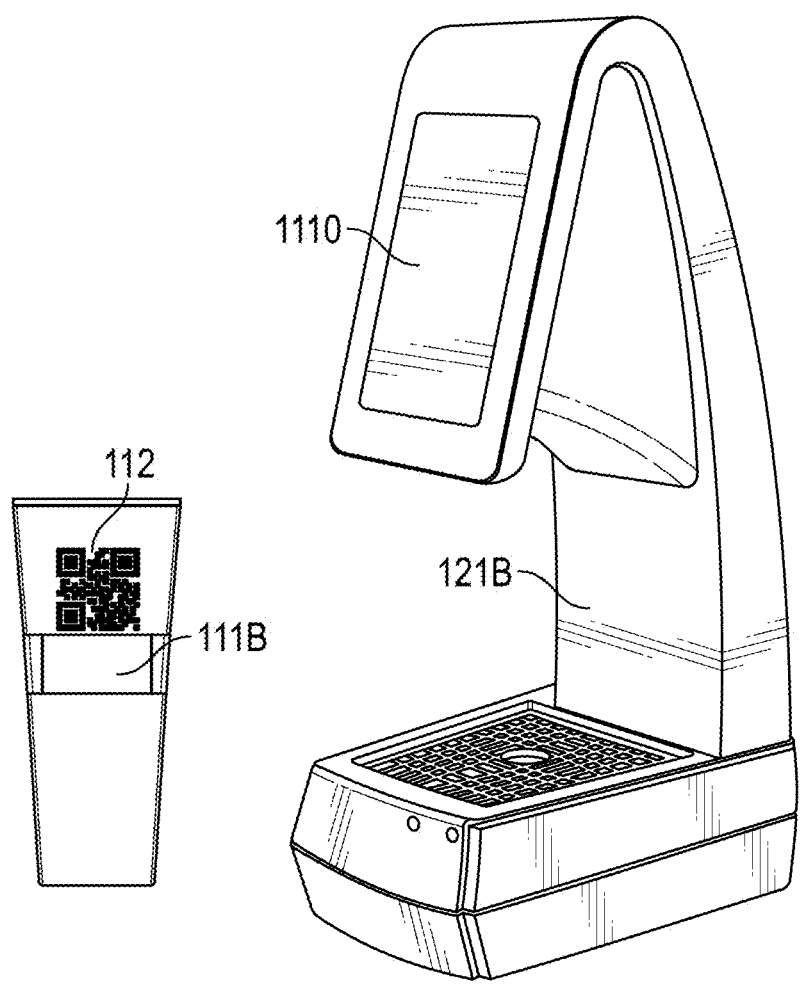
FIG. 13 is a perspective view of an exemplary reconfigurable beverage dispenser with a reconfigurable smartcup tag reader/writer in a second position.
Figure 14:
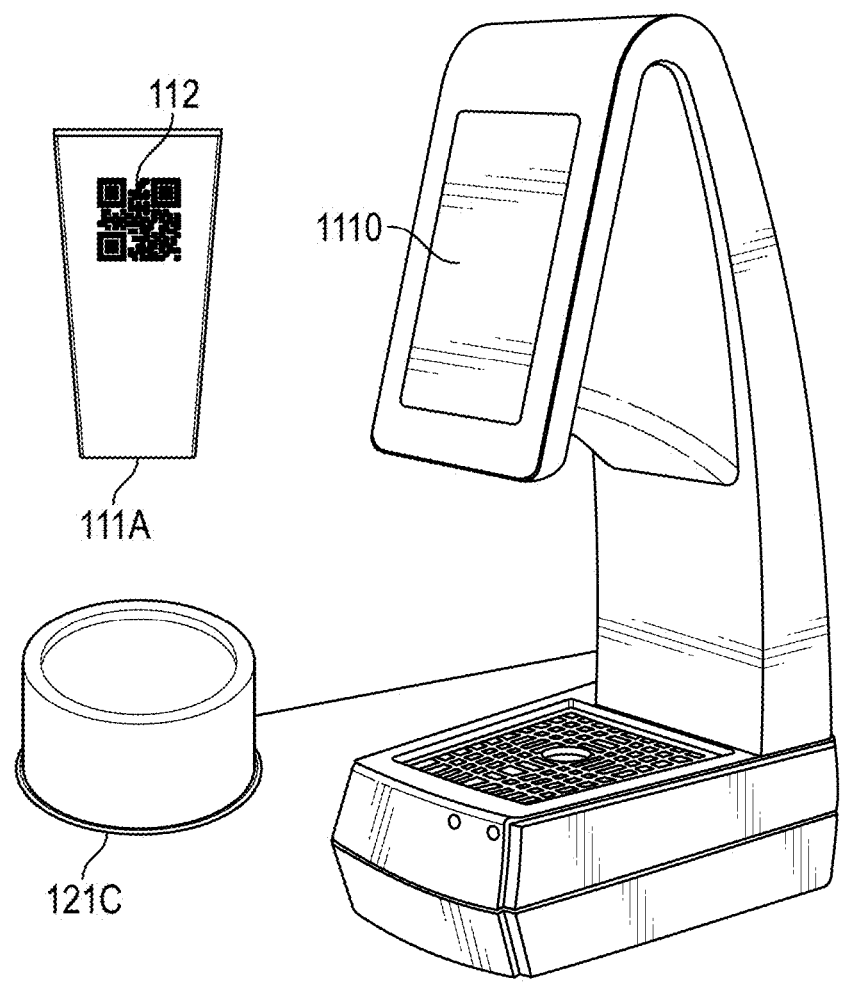
FIG. 14 is a perspective view of an exemplary reconfigurable beverage dispenser with a reconfigurable smartcup tag reader/writer in a third position.

V. Reconfigurable Beverage Dispenser with Reconfigurable Smartcup Tag Reader/Writer Positions FIGS. 11-14 show various system configurations for the beverage dispenser 120 and the smartcup tag reader/writer. For example, FIG. 11 shows a perspective view of an exemplary reconfigurable beverage dispenser with a reconfigurable smartcup tag reader/writer in a first position, FIG. 13 shows a perspective view of an exemplary reconfigurable beverage dispenser with a reconfigurable smartcup tag reader/writer in a second position, and FIG. 14 shows a perspective view of an exemplary reconfigurable beverage dispenser 120 with a reconfigurable smartcup tag reader/writer in a third position.

FIG. 11 is a perspective view of an exemplary reconfigurable beverage dispenser 120 with a reconfigurable smartcup tag reader/writer in a first position. The beverage dispenser 120 of FIG. 11 shows a smartcup beverage dispensing system including a beverage dispenser 120 where the smartcup tag reader/writer is positioned within a puck integrated into the drain cover (also referred to as a "drip pan cover") of the beverage dispenser 120. The drain cover contains a number of holes to allow for beverage that is spilled from the beverage dispenser 120 to fall into the drain compartment (also referred to as a "drip pan"). However, the drain cover is removable so that the drain compartment may be easily cleaned. As such, where the puck integrates the smartcup tag reader, a power source may be fed through the drain cover to ensure the smartcup tag reader is powered. Thus, magnetic power connectors may be used that provide power to the smartcup tag reader through the drain cover. As such, power cables/power wires may be connected through the body of the beverage dispenser 120, through magnetic connectors located on the body of the drain compartment and the drain cover, and connect to the smartcup tag reader to provide power. The power lines may be placed to limit contact with spilled beverage and the magnetic connectors may ensure a correct placement of the puck with the integrated smartcup tag reader to ensure smartcup tags are correctly read.

Further, FIG. 11 shows an exemplary smartcup including a smartcup tag 111A and smartcup visual identifier 112. The smartcup tag is placed in a position that corresponds to the location of the smartcup tag reader. For example, the smartcup tag is embedded into the bottom of the smartcup 110 so that it is as close as possible to the integrated smartcup tag reader in the puck of the beverage dispenser 120. Accordingly, a minimum amount of power and less powerful smartcup tag readers can be implemented because the distance between the smartcup tags and the smartcup tag readers may be minimized.

FIG. 12 shows two photographic illustrations of an exemplary reconfigurable beverage dispenser 120 with a reconfigurable smartcup tag reader/writer in a first position where a drip pan cover of the beverage dispenser 120 is held in position through magnetic contacts on the drip pan cover and the drip pan/beverage dispenser body to ensure the correct position of the smartcup tag reader/writer. The magnetic connectors 122A, 122B of the beverage dispenser 120 are configured to be magnetically coupled to the magnetic connectors 123A, 123B of the drip pan cover. The placement of the magnetic connectors is such that when the magnetic connectors of the drip pan cover 123A, 123B and the drip pan/beverage dispenser body are magnetically coupled, the puck with the integrated smartcup reader will line up with the dispensing valves such that a smartcup may receive any dispensed beverage as well as allow for reading and writing of information on the smartcup tag embedded into the bottom of the smartcup.

FIG. 13 is a perspective view of an exemplary reconfigurable beverage dispenser 120 with a reconfigurable smartcup tag reader/writer in a second position. The beverage dispenser 120 of FIG. 13 shows the smartcup tag reader being positioned into the vertical panel of the beverage dispenser 120. The smartcup tag reader may be integrated and/or embedded into the vertical panel, may be placed on the inside of the body panel, and/or may be placed visibly on the outside of the vertical panel of the beverage dispenser 120. However, typically the smartcup tag reader may be placed such that it cannot be seen because the smartcup tag may be read and written to without requiring a visible sightline between the smartcup tag reader and the smartcup tag.

FIG. 14 is a perspective view of an exemplary reconfigurable beverage dispenser 120 with a reconfigurable smartcup tag reader/writer in a third position. The beverage dispenser 120 of FIG. 14 includes a smartcup tag reader/writer that is positioned external to the beverage dispenser 120 and is electrically coupled to the beverage dispenser 120. A user may place the smartcup including the smartcup tag onto the smartcup reader prior to dispensing and during authentication of the smartcup identifier and dynamic token and selection of a beverage, the user may move the cup below the dispenser nozzle for dispensing of the beverage. Similar to FIG. 11, the smartcup tag may be positioned within the smartcup such that the smartcup tag and the smartcup tag reader are positioned as close as possible to one another when the smartcup is placed upon the external smartcup reader/writer.

In some embodiments, a smartcup tag embedded in a separate item (e.g., card, phone, jewelry, lanyard, etc.) (not shown) may be used to initiate the dispensing transaction using the system shown in FIG. 14. For example, a user may swipe their separate portable item having an embedded smartcup tag over the external smartcup tag reader and may follow instructions on the dispenser to place their cup, select their beverage, dispense the beverage in the cup, and then end the transaction by selecting an option on the beverage dispenser and/or by the process timing out. This is advantageous because multiple cups could be filled using a single swipe of a smartcup item having an embedded smartcup tag and more flexible dispenser designs may be implemented. Additionally, cups may break down with repeated use and allowing a separate card or other item that may be repeatedly used without wear and tear due to beverages being poured into and drank from the smartcup item may extend use. Additionally, cups may be manufactured out of biodegradable material and/or more permanent materials (e.g., plastics, etc.) may be avoided because the cups may be single use while the smartcup item may be used repeatedly. Thus, embodiments may be used with temporary or single-use cups which avoid the costs and increased logistical issues associated with providing cups with embedded smartcup tags.

VI. Reconfigurable Beverage Dispensers with SmartCup Readers/Writers

Figure 15:
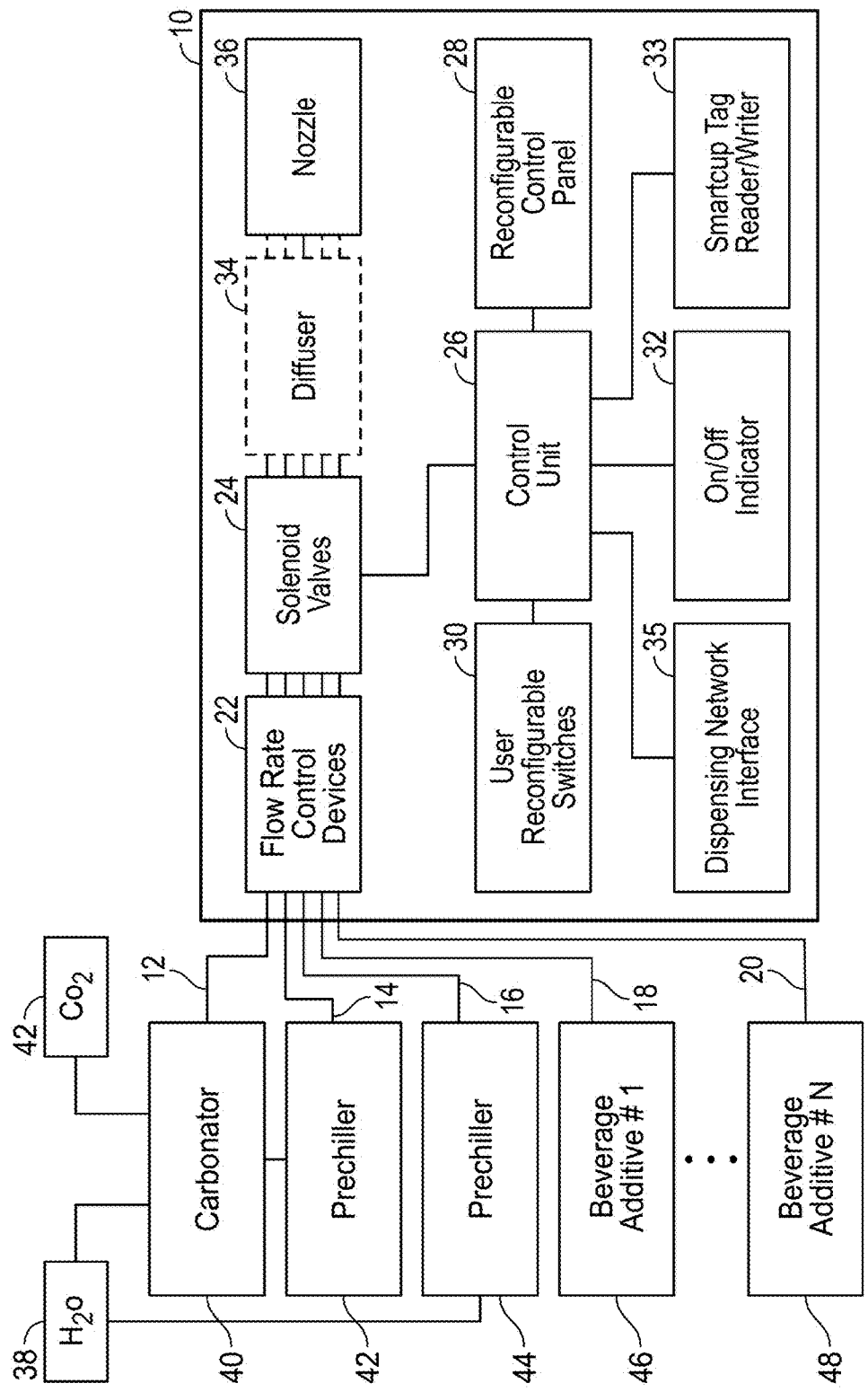
FIG. 15 diagrammatically illustrates a beverage dispenser apparatus, in accordance with many embodiments.
Figure 16:
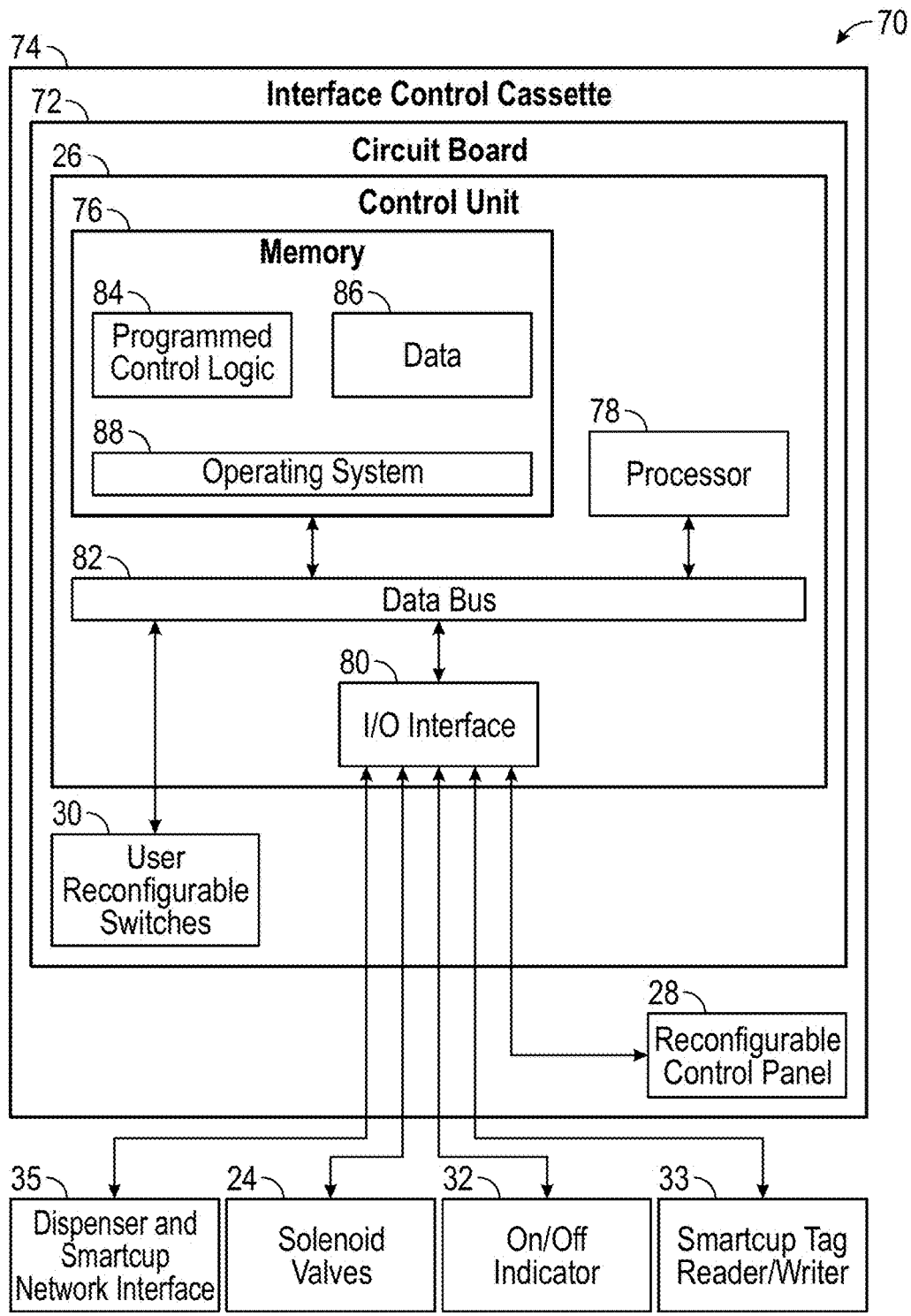
FIG. 16 diagrammatically illustrates a control system for the beverage dispenser apparatus of FIG. 15, in accordance with many embodiments.

FIG. 15 diagrammatically illustrates a reconfigurable beverage dispenser 10, in accordance with many embodiments. The beverage dispenser 10 receives a plurality of beverage fluids from a corresponding plurality of supply lines 12, 14, 16, 18, 20. The beverage dispenser 10 includes flow rate control devices 22, solenoid valves 24, a control unit 26, a reconfigurable control panel 28, user reconfigurable switches 30, an on/off indicator 32, a smartcup tag reader/writer 33, a dispenser network interface 35, and a nozzle 36. The beverage dispenser can also include a diffuser 34, or other suitable beverage fluid distribution component for distributing beverage fluid(s) discharged from the solenoid valves 24 to the nozzle 36.

The supply lines 12, 14, 16, 18, 20 are in fluid communication with associated beverage fluid sources. The supply line 12 is in fluid communication with a water source 38 through a carbonator 40. The carbonator 40 is connected to a source of carbon dioxide ($CO_2$) 42 to carbonate the water supplied by the water source 38. The carbonated water can be directly supplied to the beverage dispenser 10 via the supply line 12, or it can be cooled by a prechiller 42 connected to the carbonator 40. Prechilled carbonated water is supplied to the beverage dispenser 10 via the supply line 14. The supply line 16 is in fluid communication with the water source 38 through a prechiller 44 and supplies chilled non-carbonated water to the beverage dispenser 10. The prechiller 44 can be omitted in some embodiments so that the supply line 16 provides water from the water source 38 directly to the beverage dispenser 10. The beverage dispenser 10 can also have a heater (not shown). For example, a heater can be located a suitable location (e.g., upstream of the flow control devices 22, downstream of the solenoid valves 24) to heat one or more of the beverage fluids dispensed by the beverage dispenser 10.

The flow rate control devices 22 can include a flow rate control device coupled with each of one or more of the supply lines 12, 14, 16, 18, 20. Each flow rate control device can be used to control the rate of flow of a beverage fluid communicated by one of the supply lines. Each of the flow rate control devices can be an adjustable device (e.g., an adjustable valve) configurable to provide a desired flow rate for the beverage fluid. Example flow rate control devices 22 will be described in greater detail below with reference to FIG. 18.

The solenoid valves 24 include a solenoid valve for each of the beverage fluid supply lines. Each of the solenoid valves 24 can be individually controlled to control the discharge of an associated beverage fluid. For example, one solenoid valve can be opened to discharge a quantity of carbonated water, and another solenoid valve can be opened to discharge an appropriate quantity of beverage additive. The discharged quantities of carbonated water and beverage additive can be mixed in the diffuser 34 and dispensed from the nozzle 36 as a mixed beverage. The discharged quantities can also be separately dispensed from separate discharge ports in the nozzle. Such separate dispensing may help to reduce cross contamination between beverage fluids.

The solenoid valves 24 are controlled by the control unit 26. The control unit 26 is electrically coupled to the reconfigurable control panel 28. The control unit 26 receives user input from the reconfigurable control panel 28 and controls the solenoid valves to discharge quantities of one or more beverage fluids so as to dispense a selected beverage from the nozzle 36. The control unit 26 is also electrically coupled to the on/off indicator 32 and controls the on/off indicator 32 to indicate the on/off status of the beverage dispenser 10.

The control unit 26 is electrically coupled with one or more smartcup tag readers/writers 33. Such smartcup tag readers/writers 33 can take a variety of forms and can be positioned in a variety of areas in relation to the beverage dispenser, as further discussed below. The smartcup tag readers/writers 33 can be used by the control unity 26 to sense an external smartcup tag proximate to the smartcup tag reader/writer of the beverage dispenser 10, and read and/or write a value to/from a smartcup tag embedded in a smartcup.

The control unit 26 is electrically coupled with the user reconfigurable switches 30. The user reconfigurable switches 30 can be configured to define a selected control panel configuration.

The beverage dispenser 10 is capable of receiving water from the water source 38, carbonated water from the carbonator 40, and/or one or more beverage additives from beverage additive sources 46, 48. A beverage additive can include flavorings or syrups such as, for example, tea flavorings, coffee flavorings, vitamin shots, sweetener shots, soft drink syrups, etc. One or more beverage additives can be transferred from the beverage additive sources 46, 48 to the beverage dispenser 10 by the supply lines 18, 20 (e.g., input tubing), as described in greater detail below with reference to FIG. 17. The one or more beverage sources 46, 48 can include bag-in-box systems, as will be understood by those of ordinary skill in the art.

Water supplied to the beverage dispenser 10 can be supplied from any water source through input tubing, as described in greater detail below with reference to FIG. 17. The water and/or the carbonated water can be circulated through the prechillers 42, 44 before being supplied to the beverage dispenser 10. The prechillers 42, 44 can be any suitable device for lowering the temperature of the water and/or the carbonated water supplied to the beverage dispenser 10. The prechillers 42, 44 can be incorporated into the beverage dispenser 10. The prechillers 42, 44 can be separate devices or integrated into a single device.

The beverage dispenser 10 can be configured to receive non-carbonated water and/or carbonated water. In order to receive carbonated water, the water supplied to the beverage dispenser 10 can have carbon dioxide ($CO_2$) added to it by the carbonator 40. The carbonator 40 can be any suitable device that is capable of dissolving carbon dioxide in water or any other liquid or aqueous solution. Carbonated water can be supplied directly to the beverage dispenser 10 by the carbonator 40 or, alternatively, the carbonated water can be circulated through the prechiller 42 before it is supplied to the beverage dispenser 10. The water can additionally or alternatively be circulated through the prechiller 42 before it is supplied to the carbonator 40. The carbonator 40 can be incorporated into the beverage dispenser 10 or, alternatively, the carbonator 40 can be a separate device. However, supplying both carbonated and non-carbonated water is not required.

The beverage dispenser 10 can be capable of dispensing one or more beverage fluids used to make a beverage. As used herein, a "beverage fluid" refers to any fluid constituent of a beverage, for example, a beverage additive, water, carbonated water, various types of alcohol, or any other beverage fluid constituent. The beverage dispenser 10 can also be capable of dispensing a blended beverage by mixing one or more beverage additives with non-carbonated water and/or carbonated water. The beverage dispenser 10 can also be capable of dispensing a beverage that does not necessarily require mixing. For example, the beverage dispenser 10 can be capable of dispensing wine or beer. In addition, the beverage dispenser 10 can be capable of dispensing non-carbonated water or carbonated water.

Additionally, the beverage dispenser 10 can be capable of dispensing carbonated beverages by adding carbon dioxide to a blended beverage or by mixing carbonated water with a beverage additive. The beverage dispenser 10 can be implemented to dispense many different types of flavorings or beverage additives, flavored beverages, and blended beverages. For instance, different tea flavorings can be provided to the beverage dispenser 10 to create a variety of blended tea beverages. The beverage dispenser 10 can be used to dispense various flavorings and beverages, including but not limited to water, tea, coffee, juices, energy drinks, vitamin-fortified beverages, high fructose corn syrup beverages, or diet beverages.

Further, the beverage dispenser is configured to connect to a communications network through a dispenser network interface 35 to communicate with a dispenser network computer 130. The dispenser network interface 35 may include any suitable hardware and/or software to allow connection to the dispenser network computer 130.

Additional details regarding beverage dispensers and corresponding methods and processes may be found in U.S. patent application Ser. No. 14/588,043, titled "BEVERAGE DISPENSING APPARATUS WITH PRESENCE SENSING, filed Dec. 31, 2014, which is hereby incorporated by reference in its entirety for all purposes.

VII. Control System for Reconfigurable Beverage Dispenser

Figure 17:
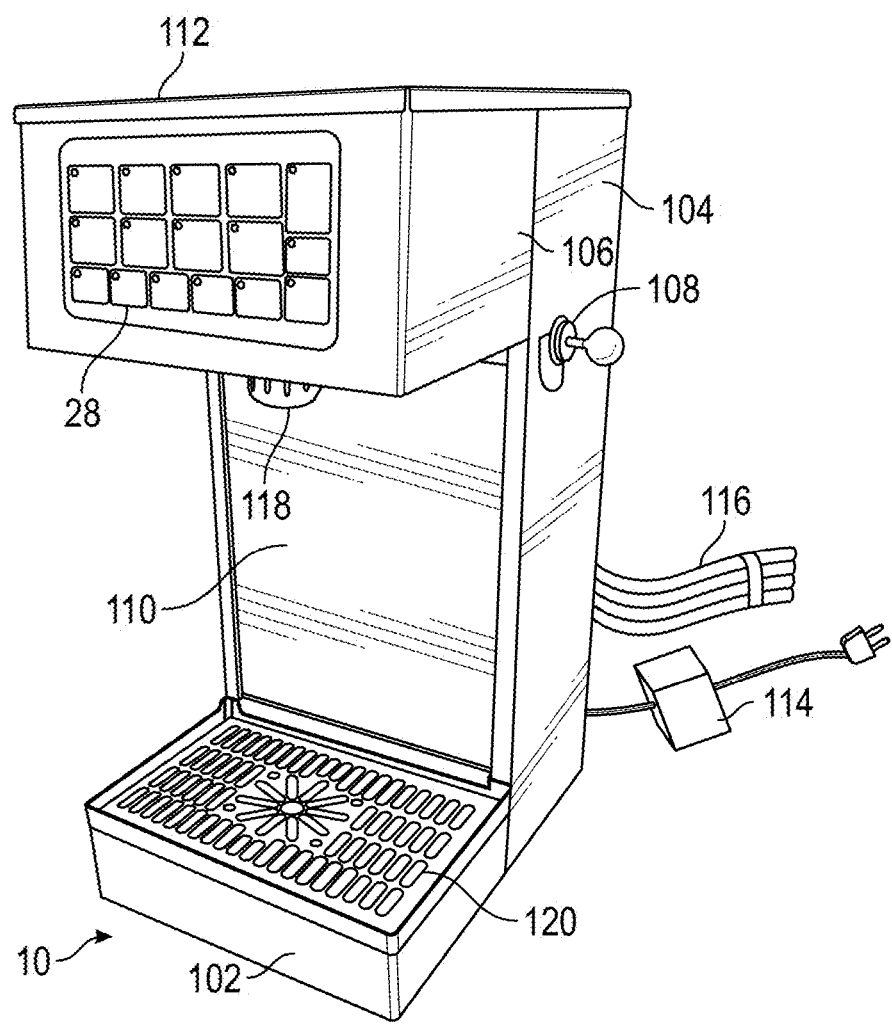
FIG. 17 is a perspective view of the reconfigurable beverage dispenser of FIGS. 14-15.

FIG. 17 diagrammatically illustrates a control system 70 for the beverage dispenser 10 of FIG. 15. The control system 70 includes the solenoid valves 24, the control unit 26, the reconfigurable control panel 28, the user reconfigurable switches 30, and the on/off indicator 32, and the one or more smartcup tag readers/writers 33. The components of the control system 70 can be conveniently grouped. Although the circuit board 72 is shown separately from and in communication with the user reconfigurable control panel 28, the circuit board 72 can be integrated with the user reconfigurable control panel 28.

The circuit board 72 includes a memory 76, the user reconfigurable switches 30, a processor 78, and an I/O interface 80 coupled to a data bus 82. The memory 76 or other suitable computer readable media can store programmed control logic 84 (e.g., software code) for performing the functions of the control unit 26. For example, the computer readable medium can comprise programmed control logic 84 or software code for receiving and processing information such as a user selected control panel configuration and other user input, code for actuating the solenoid valves 24 based on various dispensing options for a selected control panel configuration, and any other suitable code associated with the operations of the beverage dispenser 10. The memory 76 can also store data 86 and an operating system 88 used in the operation of the beverage dispenser 10. For example, the memory 76 can store a user selected control panel configuration for reconfiguring the buttons on the reconfigurable control panel 28. The processor 78 can use the operating system 88 to execute the programmed control logic 84, and in doing so, can also use any stored data 86. The data bus 82 provides communication between the memory 76, the processor 78, and the user reconfigurable switches 30.

The circuit board 72 can also be in communication with other components of the beverage dispenser 10 and/or other external devices, such as the prechillers 42, 44, the carbonator 40, and/or buttonboards or other user interface devices, via the I/O interface 80. The circuit board 72 also communicates with the reconfigurable control panel 28, solenoid valves 24, on/off indicator 32, one or more smartcup tag readers/writers 33, and dispenser network interface of the beverage dispenser 10 via the I/O Interface 80. The control unit 26 and the programmed control logic 84 can comprise software, hardware, firmware or any combination thereof.

The reconfigurable control panel 28 receives user input associated with the operation of the beverage dispenser 10. The user input can then be communicated to the control unit 26.

VIII. Example Reconfigurable Beverage Dispensers

FIG. 17 is a perspective view of a beverage dispenser 10, in accordance with FIG. 15. The beverage dispenser 10 includes a base portion 102, a trunk portion 104, and an upper portion 106. The beverage dispenser 10 also includes a lock and button mechanism 108, a front access panel 110, a top access panel 112, an electric plug assembly 114, input tubing 116, a communications network input (not shown), the reconfigurable control panel 28, a nozzle cap 118, and a drip pan 120.

Although the base portion 102 is free standing in the illustrate example, the base portion 102 can be fixed or removably attached to a surface such as a counter. The base portion 102 of the beverage dispenser 10 is also fixed or removably attached to the trunk portion 104. The upper portion 106 is attached to the trunk portion 104 of the beverage dispenser 10 by hinges (not shown). The hinges allow for easy opening of the beverage dispenser 10, as will be explained in greater detail below. Although hinges are used in this embodiment, other suitable mechanisms can be used to attach the upper portion 106 to the trunk portion 104. For example, a variety of screws, tabs, snaps, bolts, or other devices can be used to facilitate attachment, some of which can be fixed and others of which can be moveable.

The top access panel 112 can be removably attached on top of both the upper portion 106 and the top of the trunk portion 104. The top access panel 112 can provide protection to internal components of the beverage dispenser 10, and the top access panel 112 can also prevent the beverage dispenser 10 from being opened when it is in place. The top access panel 112 can simply rest on top of the beverage dispenser 10 or, alternatively, it can be secured in place on the beverage dispenser 10. A variety of screws, tabs, snaps, bolts, or other devices can be used to facilitate the secured attachment of the top access panel 112 to the beverage dispenser 10, and the attachment can be a fixed attachment or a moveable attachment.

Figure 18:
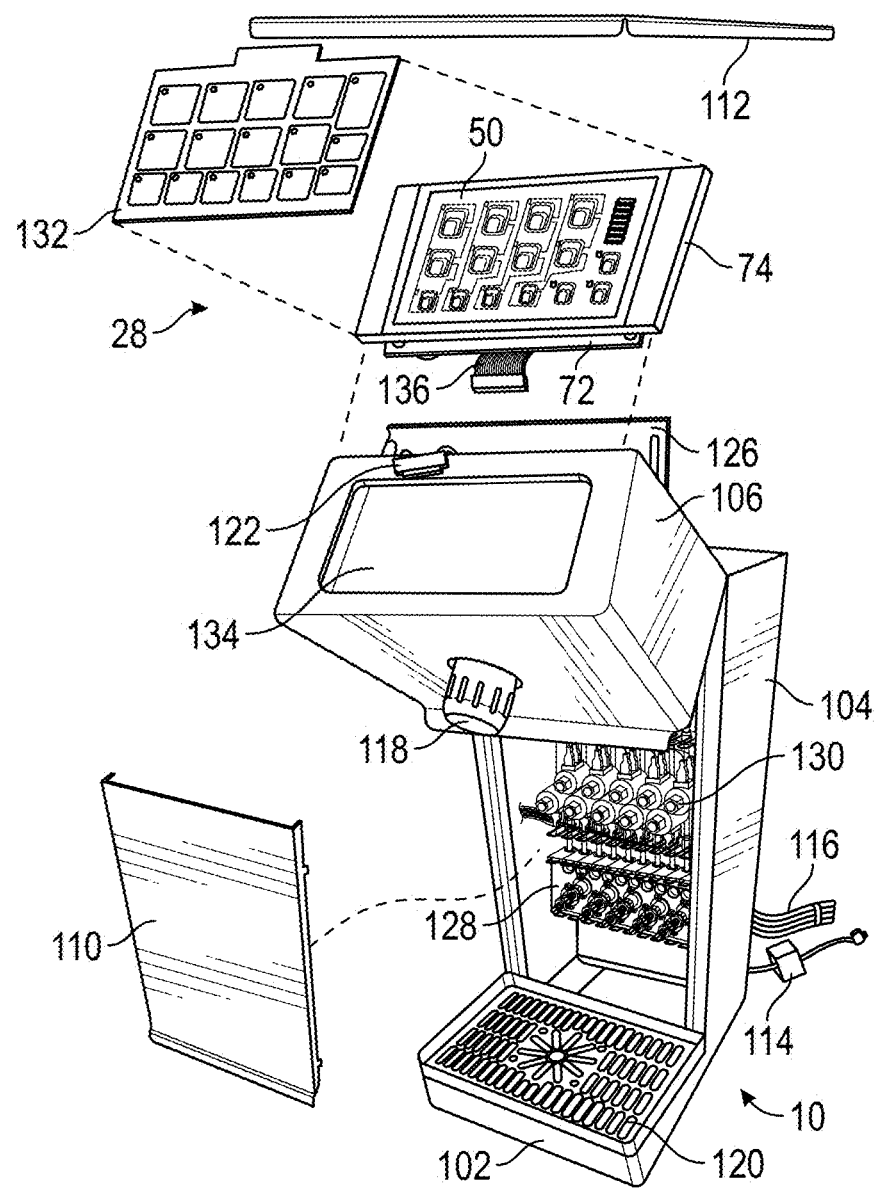
FIG. 18 is a partially exploded view of the beverage dispenser apparatus of FIG. 16.

The opening or closing of the beverage dispenser 10 and/or delivery of power to the beverage dispenser 10 can be controlled by the lock and button mechanism 108. For example, when the lock and button mechanism 108 is unlocked and the top access panel 112 is removed, the upper portion 106 of the beverage dispenser 10 can be opened upward (as shown in FIG. 18) to allow easy access to internal components of the beverage dispenser 10. Additionally, when the upper portion 106 is in an opened position, the front access panel 110 can be removed, allowing additional access to the internal components of the beverage dispenser 10. The easy access to internal components of the beverage dispenser 10 may assist in maintenance and service of the beverage dispenser 10 and its components. Further, when the upper portion 106 is in an opened position, the interface control cassette 74 can be disconnected from a dispenser plug 122 and removed from the upper portion 106 for reconfiguration (shown in FIG. 18). The front access panel 110 can be removably attached to the trunk portion 104 of the beverage dispenser 10, and the front access panel 110 may provide protection to internal components of the beverage dispenser 10. The front access panel 110 can be held in place by the upper portion 106 of the beverage dispenser 10 or, alternatively, it can be secured in place by any suitable means such as, for example, screws, tabs, snaps, or bolts. The opening or closing of the beverage dispenser 10 and/or delivery of power to the beverage dispenser 10 can be controlled by other mechanisms or devices than the lock and button mechanism 108. For example, the delivery of power to the beverage dispenser 10 can be controlled by a power switch or button situated on the beverage dispenser 10.

The beverage dispenser 10 receives electrical power from the electric plug assembly 114, which can include a standard two or three-prong electric plug. The electric plug assembly 114 can further include a power transformer that is capable of receiving a standard electrical power signal such as, for example, a power signal of approximately 120V (or approximately 240V in European applications) and supplying the beverage dispenser 10 with an appropriate power signal. The power signal provided to the beverage dispenser 10 can be a relatively low voltage signal such as, for example, a 12V power signal.

Although not shown, the beverage dispenser 10 connects to a communications network through a wired communications network input (not shown) and/or a wireless network interface (not shown). The communications network input (not shown) may include any suitable communications medium (e.g., Ethernet cable, DSL cable, fiber optic cable, etc.) that connects the beverage dispenser 10 to a modem or other communications system or components that are configured to communicate with other devices and computers connected to the internet or other communications network (e.g., telecommunications network, etc.). For example, in some embodiments, the wired communication network input connects the dispenser network interface of the beverage dispenser 10 to the dispenser network computer 130 configured to communicate, monitor, and manage communications with the beverage dispenser 10 over the internet. In some embodiments, the beverage dispenser 10 may comprise a wireless modem that connects the dispenser network interface of the beverage dispenser to the dispenser network computer 130 configured to communicate, monitor, and manage communications with the beverage dispenser.

The beverage dispenser 10 receives beverage fluids (e.g., beverage additive(s), water, carbonated water, beer, wine, etc.) through the input tubing 116. The input tubing 116 can be any tubing suitable for transporting a beverage fluid to the beverage dispenser 10 such as, for example, rubber or plastic tubing. The input tubing 116 can include one or more tubes that may or may not be insulated. For example, the input tubing 116 used to transport water from a prechiller to the beverage dispenser 10 can be insulated in order to maintain the water at a desired temperature. The input tubing 116 can be insulated with any suitable insulation material capable of maintaining a beverage fluid transported through the input tubing 116 at a desired temperature.

The reconfigurable control panel 28 is used to select one or more beverage options such as type of blended beverage, cup size, flavor shot, and/or other suitable option. The reconfigurable control panel 28 can be programmed or reconfigured by the user, as described in greater detail above and below. After the beverage options are selected, the beverage is dispensed by the beverage dispenser 10 through a nozzle block 124 (shown in FIG. 18). After the beverage is dispensed through the nozzle block 124, its flow can be partially or completed directed by the nozzle cap 118 into a cup or other container (not shown). Although the nozzle cap 118 is designed to minimize splash, splatter, and overspray of the dispensed flavor shot or blended beverage, as will be described below, the drip pan 120 provided in the base portion 102 of the beverage dispenser 10 may catch any splash, splatter, or overspray by the beverage dispenser 10 and any spillover from the beverage receiving cup. The drip pan 120 can further be removable for emptying and cleaning. A drain can be provided at the bottom of the drip pan 120, and that the drain can transport any splash, splatter, overspray, or spillover away from the beverage dispenser 10.

The beverage dispenser 10 has a C-shaped body with a relatively small footprint and is easily transportable. The beverage dispenser 10 illustrated is approximately 8⅜" wide by approximately 11½" deep, and approximately 18⅜" tall. Due to its size, the beverage dispenser 10 is commonly referred to as a 2-wide valve tower. However, a reconfigurable beverage dispenser can be implemented in many different sizes and configurations. For example, a reconfigurable beverage dispenser can be integrated into a larger six or eight-wide valve tower. In such a configuration, the beverage dispenser 10 essentially replaces two nozzles of the larger beverage dispenser, such as the two center nozzles, thereby creating a combined dispenser with additional nozzles on either side of the beverage dispenser 10 portion. As another example, the reconfigurable beverage dispenser can be or fixedly or removably attached to a countertop or other surface. Such a configuration may be desirable where the reconfigurable beverage dispenser is located in a high traffic area (e.g., a bar) to prevent the beverage dispenser from being disrupted if it is impacted.

FIG. 18 is a partially exploded view of various components of the beverage dispenser 10. As shown in FIG. 18, the upper portion 106 is in an opened position, the front access panel 110 has been removed, and the top access panel 112 has been removed.

FIG. 18 also shows an upper portion access panel 126 in the upper portion 106 of the beverage dispenser 10. The upper portion access panel 126 can be opened in order to provide easy access to the interface control cassette 74 and its various components. When the upper portion access panel 126 is opened, the user can access the reconfigurable control panel 28 and reconfigure it. In many embodiments, the user can remove the interface control cassette 74 and detach it from the dispenser plug 122 when the upper portion access panel 126 is opened. The user can then reconfigure the reconfigurable control panel 28 outside the beverage dispenser 10. The upper portion access panel 126 may also provide protection to the electronics of the interface control cassette 74 and assist in preventing undesirable moisture or leakage associated with the beverage dispenser from contacting the various components of the interface control cassette 74.

The upper portion access panel 126 can be attached to the upper portion 106 of the beverage dispenser 10 by hinges (not shown) or other suitable attachment mechanism. For example, any variety of screws, tabs, snaps, bolts, or other devices could be used to facilitate the attachments, some of which can be fixed and others of which can be moveable. The use of hinges may allow for easy access to internal components; however, other forms of attachments may also be advantageous if, for example, the attachment(s) allows easy servicing of the interface control cassette 74. The upper portion access panel 126 can be removably attached to the upper portion 106 of the beverage dispenser 10. Also, the upper portion access panel 126 can be unattached to the upper portion 106 and merely rest on top.

The internal components of the beverage dispenser 10 include a flow control block 128 and a solenoid block 130. The solenoid block 130 is illustrated as being transparent so that its internal components are partially visible. Additionally, the components of the interface control cassette 74 are illustrated. The components of the interface control cassette 74 include the reconfigurable control panel 28 and the circuit board 72. The reconfigurable control panel 28 includes the reconfigurable control panel component 50 and the cover plate 132. An upper portion opening 134 in the upper portion 106 is also shown.

In operation, when a beverage fluid(s) enters the beverage dispenser 10 via the input tubing 116, the beverage fluid(s) enters the flow control block 128. The flow control block 128 includes a plurality of adjustable orifices (e.g., adjustable valves) that define the flow rate of the beverage fluid(s). The flow rate can be individually controlled for each beverage fluid and the flow rate for each beverage fluid can be set so it remains constant at a set rate for each beverage additive. When the beverage fluid(s) exits the flow control block 128, it flows to the solenoid block 130, and then from the solenoid block 130 to the nozzle block 124 (shown in FIG. 19) in the upper portion 106. The solenoid block 130 is coupled with a plurality of solenoid valves 24. Each solenoid valve 24 controls the flow path of each of the beverage additives. When a gate is opened, a beverage additive flows to the nozzle block 124, where it can be dispensed by the beverage dispenser 10. Other beverage fluids (e.g., beverage additive(s), water, carbonated water, beer, wine) flow through the beverage dispenser 10 in the same manner.

The interface control cassette 74 controls the actuation of the various solenoid valves 24 of the solenoid block 130 based on user input, thereby allowing a user of the beverage dispenser 10 to select a beverage to be dispensed from the beverage dispenser 10. The functionalities of each of these internal components will be described in greater detail below.

The interface control cassette 74 includes the reconfigurable control panel 28 and the circuit board 72, which includes the control unit 26 and the user reconfigurable switches 30. As explained in greater detail above with reference to FIG. 18, the reconfigurable control panel 28 is capable of receiving user input for the beverage dispenser 10. Other types of reconfigurable input devices can be used as an alternative to the reconfigurable control panel 28. For example, one or more liquid crystal displays (LCD's) and/or one or more touch screen displays can be used as a reconfigurable input device.

In the illustrated embodiment, the interface control cassette 74 is accessible when the upper portion access panel 126 is lifted into an opened position. In some embodiments, a user can reconfigure the reconfigurable control panel 28 through the openings in the upper portion 106. The interface control cassette 74 can be a removable cassette situated inside the upper portion 106 of the beverage dispenser 10. A user can detach the interface control cassette 74 from the dispenser plug 122 and remove the interface control cassette 74 from the upper portion 106 so that the user has access to the interface control cassette 74 outside of the upper portion 106.

In order to provide power to the interface control cassette 74 and/or to facilitate communication between the interface control cassette 74 and other components of the beverage dispenser 10 such as, for example, the solenoid block 130, the interface control cassette 74 can include a cassette plug 136 that is connected to the associated beverage dispenser plug 122.

The cover plate 132 can be inserted between the interface control cassette 74 and the front of the upper portion 106 of the beverage dispenser 10. The cover plate 132 can be a removable or interchangeable card or, alternatively, it may be affixed inside the upper portion 106. The cover plate 132 can also be affixed to the front of the upper portion 106 rather than being situated inside the upper portion 106. If the cover plate 132 is inserted inside the upper portion 106, it can be viewed and accessed through an upper portion opening 134 situated in the front of the upper portion 106.

The cover plate 132 can include indicia identifying the various beverage additives and/or beverages for dispensing from the beverage dispenser 10, the available size selections, other user selectable options, as well as marketing indicia. The indicia can be printed on the cover plate 132 and/or can be at least partially formed integrally into the cover plate 132. The beverage additives and/or beverages corresponding to those shown on the cover plate 132 can be programmed into the interface control cassette 74. When desired, such as when the beverages provided by the beverage dispenser 10 are changed and/or the control logic of the interface control cassette 74 is changed, a different cover plate can be inserted into the beverage dispenser. For example, the cover plate can be changed as the selection of flavor shots and beverages dispensed by the beverage dispenser changes.

The interface control cassette 74 can include distinct components as shown in FIG. 18 or, alternatively, some or all of the features of one of the components can be incorporated into another component. For example, the display of beverage options can be incorporated into the interface control cassette 74 by a touch screen display on the interface control cassette 74 from which a user can both view and select beverage options. As another example, the reconfigurable control panel 28 and the cover plate 132 can be disposed remote from the control unit 26 but include the ability to receive user input and transmit any received user input to the control unit 26. Other suitable input devices can be used with a reconfigurable beverage dispenser. For example, push buttons, contact switches, mouse and/or buttonboard, touch screen displays, or capacitive resistance input devices can be used in a reconfigurable beverage dispenser, and the functionality of such input devices can be reconfigured in accordance with a desired beverage dispenser configuration.

The volume of water, carbonated water, and/or beverage additive(s) dispensed by the beverage dispenser 10 can be determined by the cup size button (e.g., delineated button area 68($a$)) that is selected. The volumes of water, carbonated water, and/or beverage additive(s) dispensed by beverage dispenser 10 can be individually programmed into the interface control cassette 74 for each cup size and beverage (e.g., blended beverage or flavor shot). The volume of a beverage additive in a flavor shot or blended beverage can be in shot size increments in some cases. Any number of flavor buttons, shot size increments, or cup sizes can be implemented, and those depicted and/or described are for illustrative purposes only.

The volume of a beverage additive(s) dispensed for a given beverage (e.g., blended beverage or flavor shot) and cup size can be defined in any suitable way and then programmed into the interface control cassette 74 in any suitable fashion. In many embodiments, a user can program into the interface control cassette 74 the volumes of a beverage additive(s) that will be dispensed for each cup size. For example, a user can program the interface control cassette 74 to dispense a flavor additive X in a one-quarter ounce shot size increment for a small cup size, in a one-third ounce shot size increment for a medium cup size, and in a one-half ounce shot size increment for a large cup size. As another example, a user can program an incremental volume increase for a beverage additive into the interface control cassette 74. An incremental volume increase refers to the increase of volume of a beverage additive dispensed between progressively larger cup sizes. For example, if an incremental volume increase of one-half ounce shot was programmed for flavor additive Y, then a one-half ounce shot would be dispensed for a small cup size, a one ounce shot would be dispensed for a medium cup size, a one and one-half ounce shot would be dispensed for a large cup size, and a two ounce shot would be dispensed for an extra-large cup size. A volumetric ratio can also be programmed into interface control cassette 74 for one or more beverages. A volumetric ratio refers to the ratio of the volume of beverage additive to the volume of the water or total volume of beverage for all cup sizes. A volumetric ratio can provide a more constituent flavor profile for a given beverage dispensed for any cup size. Providing a volumetric ratio may help avoid dispensing beverages which are weaker or stronger depending on the cup size and when the beverage is dispensed. A volumetric ratio can be programmed into the interface control cassette 74 for each beverage. A user can also calibrate a timed dispense of a beverage additive and/or water dispensed for one or more beverages, and can program the timed dispense values into the interface control cassette 74. In this way, the user can test the flavor profile of the beverage and calibrate the timed dispense accordingly. The timed dispense of a beverage additive and/or water determines the dispensing volumes and can correlate to the volumetric ratio.

Figure 19:
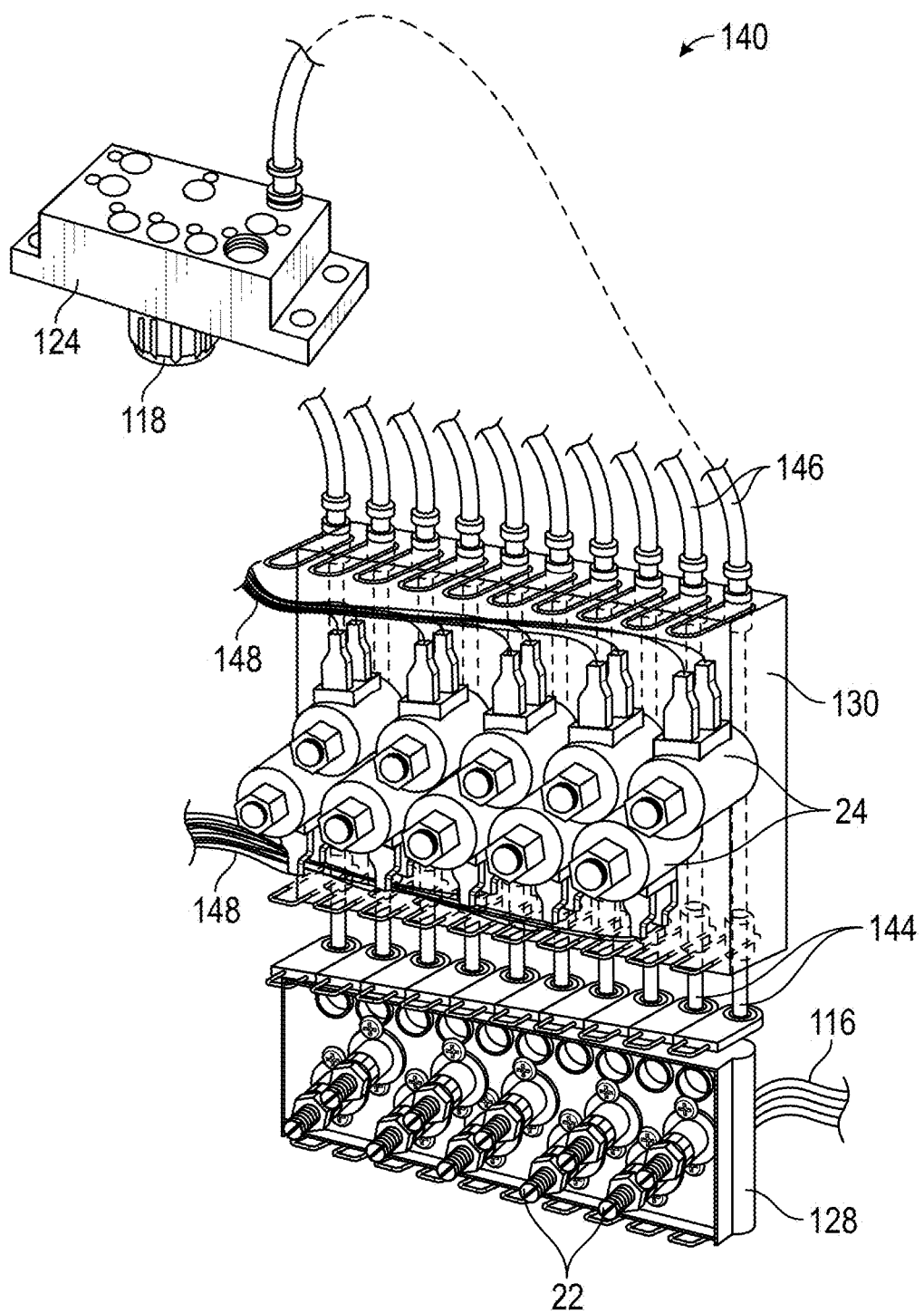
FIG. 19 is a perspective view of flow control system components for the beverage dispenser of FIGS. 17-18.

FIG. 19 is a perspective view of a flow control system 140 of the beverage dispenser 10. The flow control system 140 includes the flow control block 128, the solenoid block 130, and the nozzle block 124. In operation, after a beverage fluid(s) enters the beverage dispenser 10 via the input tubing 116, it flows into the flow control block 128, and then to the solenoid block 130. The flow control block 128 controls the flow rate of the beverage fluid(s) into the solenoid block 130. The solenoid valves 24 in solenoid block 130 are actuated by the interface control cassette 74 to allow the beverage fluid(s) to flow to the nozzle block 124 for dispensing from the beverage dispenser 10. Although the solenoid block 130 is described herein as being situated downstream from the flow control block 128, the flow control block 128 can be situated downstream from the solenoid block 130. Also, a flow control system for a reconfigurable beverage dispenser can include a plurality of individual solenoids coupled with individual gate valves that are in fluid communication with the flow control block 128.

The flow control block 128 includes one or more flow control devices 22 (e.g., adjustable valve) or other flow rate control devices that control the flow rate of the beverage fluids (e.g., beverage additive(s), water, carbonated water, beer, wine, etc.) provided to the flow control block 128 by the input tubing 116. Although valves are shown in FIG. 19, other means for controlling flow rate can be used, for example, one or more orifices. The flow control block 128 provides an individual channel for each beverage fluid. The input tubing 116 is coupled to the flow control block 128. More specifically, each tube of the input tubing 116 is coupled to an associated or corresponding flow control device 22 of the flow control block 128. A flow control device 22 is provided for each beverage fluid provided to the flow control block 128. The flow rate is individually controlled for each beverage fluid by one of the flow control devices 22. Additionally, the flow rate for each beverage fluid can be set so that it remains constant for each beverage fluid. Any suitable device can be used for regulating the flow rate of the beverage fluids. The flow control devices 22 can be arranged or positioned in a staggered or offset array, thereby requiring relatively little space and, consequently, at least partially contributing to a relatively small footprint for the beverage dispenser 10.

A flow control device 22 for the beverage dispenser 10 can be constructed from any suitable material such as, for example, plastic, rubber, or a combination of plastic and rubber. The flow control block 128 can also be constructed from any number of suitable materials such as, for example, plastics, rubber, acrylics, metals, polymers, synthetic materials, or a combination of any such materials.

When a beverage fluid exits the flow control block 128, it is transported to the solenoid block 130 by solenoid input tubing 144. The solenoid input tubing 144, which can be insulated or non-insulated, can be any tubing suitable for transporting a beverage fluid from the flow control block 128 to the solenoid block 130 such as, for example, rubber or plastic tubing. The solenoid input tubing 144 can be terminated at the periphery of the solenoid block 130. Alternatively, the solenoid input tubing 144 can further extend into the solenoid block 130 to the solenoid valves 24 coupled within the solenoid block 130. One or more suitable devices such as, for example, pins, staples, or braces, can secure the solenoid input tubing 144 in place at the solenoid block 130. Although the flow control block 128 and the solenoid block 130 are depicted as two separate and distinct components of the beverage dispenser 10, the flow control block 128 and the solenoid block 130 can be integrally formed as a single component of the beverage dispenser 10.

Each of the solenoid valves 24 control the flow path of a beverage fluid through the solenoid block 130. A solenoid valve 24 can be provided for each beverage fluid. When a solenoid valve 24 is actuated or opened, a beverage fluid flows past the solenoid valve 24, through the solenoid block 130, and exits into an output tube 146. The output tube 146 carries the beverage fluid to the nozzle block 124, where it is dispensed by the beverage dispenser 10. The interface control cassette 74 controls the actuation of the various solenoid valves 24 based on user input, thereby dispensing a user selected beverage from the beverage dispenser 10. Control signals from the interface control cassette 74 to the solenoids 132 are electrically communicated via solenoid wires 148, which can be any type of wire suitable for communicating an electrical signal to the solenoid valves 24.

The solenoid block 130 can form a centralized manifold for the flow of beverage fluids controlled by the array of solenoid valves 24. The use of a single block (e.g., an acrylic block) may decrease leak points, help maintain steady flow rates, and reduce pressure drops across the solenoid array. An acrylic block can also be easily machined and, if a clear acrylic block is utilized, the clear acrylic block may allow for increased visibility of the internal components of the solenoid block 130, thereby providing for easier trouble shooting of the solenoid block 130. The solenoid valves 24 can be arranged in a staggered array, as illustrated. A staggered array arrangement for the solenoid valves 24 may require relatively little space, and, consequently, at least partially contribute to a relatively small footprint for the beverage dispenser 10. In the illustrated embodiment, the solenoid block 130 is an acrylic block. However, many materials besides acrylic can be used to construct the solenoid block 130.

Each solenoid valve 24 includes a coil of wire encased in a housing with a moving plunger or shaft. When electricity is applied to the coil of a solenoid valve 24, the resulting magnetic field attracts the plunger and pulls it into the solenoid body, thereby allowing a beverage fluid to pass through the associated channel of the solenoid block 130. When electricity is removed, the solenoid plunger returns to its original position via a return spring or gravity, thereby preventing the flow of the beverage fluid through the associated channel of the solenoid block 130. A variety of different solenoids can be used, including, but not limited to, AC solenoids, DC solenoids, linear open frame solenoids, linear tubular solenoids, rotary solenoids, or variable positioning solenoids. Each solenoid valve 24 can include any suitable solenoid such as, for example, a 2X1578-A solenoid manufactured by KIP, Inc.

When a beverage fluid enters the solenoid block 130 through the solenoid input tubing 144, the beverage fluid flows to the one of the solenoid valves 24 via an input channel integrated into the solenoid block 130. The solenoid input tubing 144 can extend into the solenoid block 130 as an alternative to integrating input channels into the solenoid block 130. Electricity can applied to the solenoid valves 24 by way of the solenoid wires 148. A solenoid plunger is actuated to allow a beverage fluid to flow past the individual solenoid valve 24 into an output channel integrated into the solenoid block 130 and then into an output tube 146, which then carries the beverage fluid to the nozzle block 124. Electricity can be applied to control the solenoid valves 24 according to the control logic of the beverage dispenser 10. In FIG. 19, the output tubes 146 terminate at the periphery of the solenoid block 130. However, the output tubes 146 can extend into the solenoid block 130 as an alternative to integrating output channels into the solenoid block 130. Another alternative is to couple the solenoid input tubing 144 for the non-carbonated water and/or carbonated water directly to a diffuser block (shown in FIG. 15), which repositions the solenoid valves for the water and the carbonated water closer to the dispense point. Positioning the solenoid valves for the water and the carbonated water closer to the dispense point may improve the quality of the end beverage.

The output tubing 146, which can be insulated or non-insulated, can be any tubing suitable for transporting a beverage fluid from the solenoid block 130 to the nozzle block 124 (e.g., rubber tubing, plastic tubing). One or more suitable devices such as, for example, pins, staples, or braces, can be used to secure the output tubing 146 in place relative to the solenoid block 130 and/or relative to the nozzle block 124. The nozzle cap 118 can assist in directing the flow of the dispensed beverage fluid, thereby may assist in the prevention of splash, splatter, and/or overspray during the dispensing of a beverage fluid from the nozzle block 124.

Figure 20:
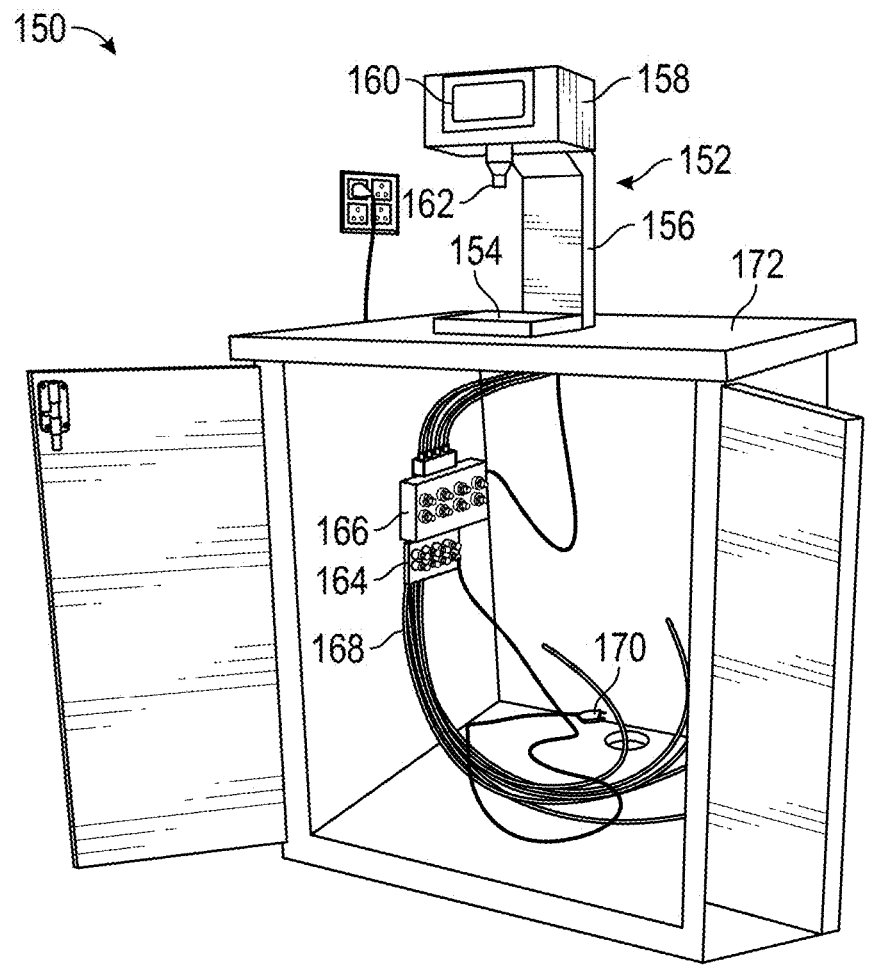
FIG. 20 is a photographic illustration of a reconfigurable beverage dispenser, in accordance with many embodiments.

FIG. 20 is a photographic illustration of a reconfigurable beverage dispenser 150, in accordance with many embodiments. In this example, several components of the beverage dispenser 150 are separately located from an exposed portion 152 of the beverage dispenser 150. The exposed portion 152 includes base portion 154, a trunk portion 156, and an upper portion 158. The upper portion 158 includes a reconfigurable control panel 160 and a dispensing nozzle cap 162. The separately located components include a flow control block 164, a solenoid block 166, input tubing 168, and an electric plug assembly 170. The beverage dispenser 150 may be advantageous in an establishment with limited counter space.

As illustrated, the base portion 154, the trunk portion 156, and the upper portion 158 of the beverage dispenser 150 are located on a counter 172 of a cabinet. The base portion 154 can be free standing or fixedly or removably attached to the counter 172 or other surface. The flow control bock 164, the solenoid block 166, the input tubing 168, the electric plug assembly 170, and other components of beverage dispenser 150 are located within the cabinet. Alternatively, one or more of the components disposed in the cabinet can be located within the upper portion 158 of the beverage dispenser 150.

As illustrated, the flow control block 164 and the solenoid block 166 are located on a wall of the cabinet beneath the exposed portion 152 of the beverage dispenser 150. The flow control block 164 and/or the solenoid block 166 can be located on another surface of any suitable location such as a room. For example, the flow control block 164 and/or the solenoid block 166 can be located on a wall of the room near the counter where the other components of beverage dispenser 150 are located.

The various participants and elements described herein may operate one or more computer apparatuses to facilitate the functions described herein. Any of the elements in the above-described FIGS. 1-2, including any servers or databases, may use any suitable number of subsystems to facilitate the functions described herein.

Figure 21:
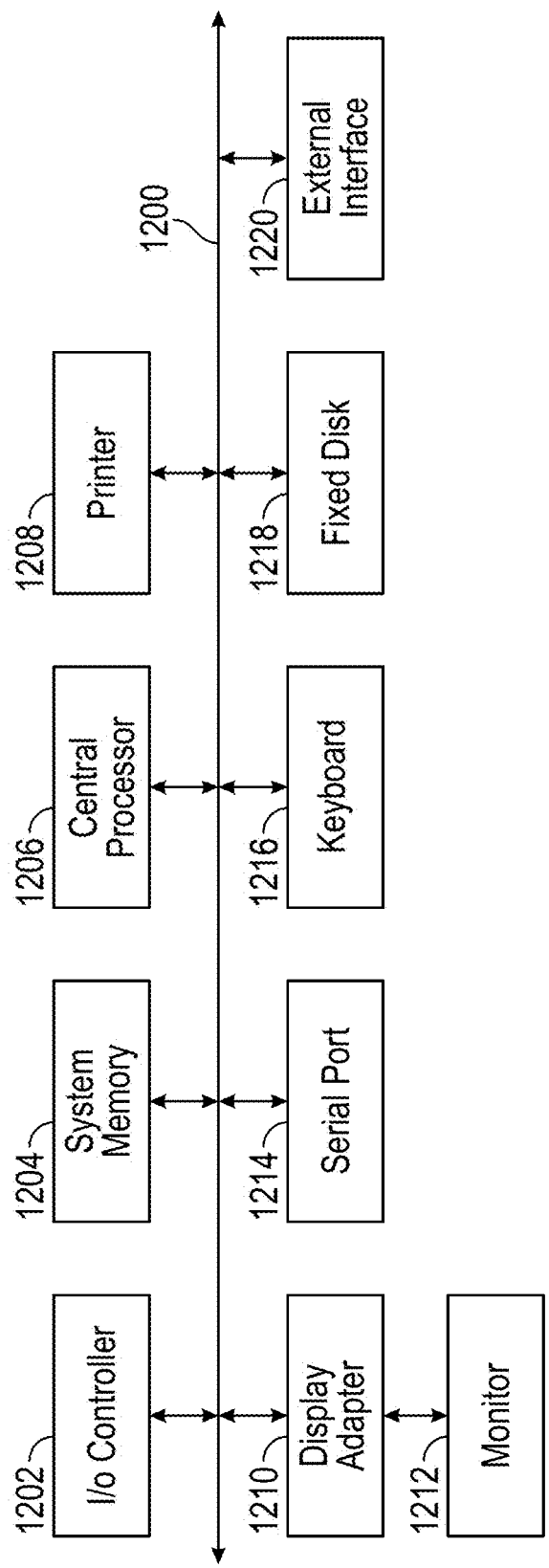
FIG. 21 diagrammatically illustrates an exemplary computer system, in accordance with many embodiments.

Examples of such subsystems or components are shown in FIG. 21. The subsystems shown in FIG. 21 are interconnected via a system bus 1200. Additional subsystems such as a printer 1208, keyboard 1216, fixed disk 1218 (or other memory comprising computer readable media), monitor 1212, which is coupled to display adapter 1210, and others are shown. Peripherals and input/output (I/O) devices, which couple to I/O controller 1202 (which can be a processor or other suitable controller), can be connected to the computer system by any number of means known in the art, such as serial port 1214. For example, serial port 1214 or external interface 1220 can be used to connect the computer apparatus to a wide area network such as the Internet, a mouse input device, or a scanner. The interconnection via system bus allows the central processor 1206 to communicate with each subsystem and to control the execution of instructions from system memory 1204 or the fixed disk 1218, as well as the exchange of information between subsystems. The system memory 1204 and/or the fixed disk 1218 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

All patents, patent applications, publications, and descriptions mentioned above are herein incorporated by reference in their entirety for all purposes. none is admitted to be prior art.

What is claimed is:
1. A method of dispensing a beverage at a beverage dispenser, the method comprising:
receiving, by the beverage dispenser, a smartcup identifier and a dynamic token from a smartcup reader, the smartcup identifier and the dynamic token being read from a smartcup tag;
sending, by the beverage dispenser, a smartcup authentication request including the smartcup identifier and the dynamic token to a smartcup server computer, wherein the smartcup server computer validates the authenticity of the smartcup identifier and the dynamic token and determines a dispense decision associated with the smartcup identifier;
receiving, by the beverage dispenser, a smartcup authentication response including the dispense decision, wherein the dispense decision indicates whether the beverage dispenser is authorized to dispense the beverage;

determining, by the beverage dispenser, that the dispense decision is affirmative;

determining, by the beverage dispenser, an updated dynamic token for the smartcup tag;

updating, by the beverage dispenser, the dynamic token of the smartcup tag with the updated dynamic token; and dispensing, by the beverage dispenser, the beverage in a cup.

2. The method of claim 1, wherein the smartcup tag is embedded in the cup.

3. The method of claim 1, wherein the smartcup tag is embedded in a portable item that is separate from the cup.

4. The method of claim 3, wherein the portable item includes a card, a fob, a watch, a bracelet, or a phone.

5. The method of claim 1, wherein the smartcup server computer validates the authenticity of the smartcup identifier and the dynamic token by:

parsing the smartcup identifier and the dynamic token from the smartcup authentication request;

searching a smartcup database for the smartcup identifier; and comparing the dynamic token to a security token associated with the smartcup identifier, wherein the authenticity of the smartcup identifier and the dynamic token is validated where the dynamic token matches the security token.

6. The method of claim 5, wherein the authenticity of the smartcup identifier and the dynamic token is not validated when the dynamic token and the security token do not match.

7. The method of claim 5, wherein if the authenticity of the smartcup identifier and the dynamic token is not validated, the dispense decision is negative and the beverage dispenser does not dispense the beverage.

8. The method of claim 1, wherein determining the updated dynamic token for the smartcup tag further comprises:

parsing, by the beverage dispenser, the updated dynamic token from the smartcup authentication response, wherein the smartcup server computer generates the updated dynamic token and wherein the smartcup server computer stores the updated dynamic token as the security token associated with the smartcup identifier after validating the authenticity of the smartcup identifier and the dynamic token.

9. The method of claim 1, wherein determining the updated dynamic token for the smartcup tag further comprises:

generating, by the beverage dispenser, the updated dynamic token; and sending, by the beverage dispenser, the updated dynamic token to the smartcup server computer, wherein the smartcup server computer stores the updated dynamic token as the security token associated with the smartcup identifier.

10. The method of claim 1, wherein the beverage is selected by a user from a list of options displayed by the beverage dispenser before dispensing the beverage.

11. The method of claim 1, wherein the smartcup server computer determines the dispense decision by:

parsing the smartcup identifier from the smartcup authentication request;

searching a smartcup database for the smartcup identifier;

determining a dispense mode associated with the smartcup identifier and validating use conditions for the smartcup authentication request;

determining the dispense decision is affirmative;

updating the use conditions associated with the smartcup identifier;

generating the smartcup authentication response including the dispense decision; and sending the smartcup authentication response to the beverage dispenser.

12. The method of claim 11, wherein the dispense mode includes one of a time limit, a number of dispenses, and a dispense volume.

13. The method of claim 12, wherein the use conditions include at least one of an expiration date, an expiration time, a number of dispense credits, and a remaining dispense volume.

14. The method of claim 1 further comprising:

reporting, by the beverage dispenser, beverage dispense information including a brand of the dispensed beverage, an amount of beverage dispensed, and a time of the beverage dispense to the smartcup server computer after dispensing the selected beverage.

* * * * *